(12) United States Patent
Maillot et al.

(10) Patent No.: US 7,446,778 B2
(45) Date of Patent: Nov. 4, 2008

(54) DYNAMICALLY ADJUSTED BRUSH FOR DIRECT PAINT SYSTEMS ON PARAMETERIZED MULTI-DIMENSIONAL SURFACES

(75) Inventors: Jerome Maillot, Toronto (CA); Anna Lipka, Toronto (CA); Azam Khan, Aurora (CA)

(73) Assignee: Autodesk, Inc., San Ranfael, CA (US)

( * ) Notice: Subject to any disclaimer, the term of this patent is extended or adjusted under 35 U.S.C. 154(b) by 0 days.

(21) Appl. No.: 11/622,228

(22) Filed: Jan. 11, 2007

(65) Prior Publication Data

US 2007/0115295 A1 May 24, 2007

(51) Int. Cl.
*G09G 5/00* (2006.01)
*G09G 1/10* (2006.01)
*G06T 15/00* (2006.01)

(52) U.S. Cl. .................. 345/582; 345/419; 345/653; 345/16

(58) Field of Classification Search ......... 345/418–420, 345/582, 619, 586, 427, 16–17, 20, 647, 345/649, 653, 658, 659, 679; 382/285, 289, 382/300
See application file for complete search history.

(56) References Cited

U.S. PATENT DOCUMENTS

| | | | |
|---|---|---|---|
| 5,592,597 A | 1/1997 | Kiss | |
| 6,037,948 A | 3/2000 | Leipa | |
| 6,239,807 B1 | 5/2001 | Bousut | |
| 6,239,809 B1 | 5/2001 | Morioka et al. | |
| 6,348,924 B1 | 2/2002 | Brinsmead | |
| 6,590,573 B1 | 7/2003 | Geshwind | |
| RE38,755 E | 7/2005 | Gueret | |

OTHER PUBLICATIONS

Bruno Levy, et al. "Least Squares Conformal Maps for Automatic Texture Atlas Generation." ISA.
Hans Pedersen. "A Framework for Interactive Texturing on Curved Surfaces." Computer Science Department, Stanford University, 1996. pp. 295-302.
Pat Hanrahan, et al. "Direct WYSIWYG Painting and Texturing on 3D Shapes." Computer Graphics, vol. 24, No. 4, Aug. 1990. pp. 215-223.
Richard Szeliski, et al. "Surface Modeling with Oriented Particle Systems." Department of Computer Science, University of Toronto, 1992. pp. 185-194.
Jerome Maillot, et al. "Interactive Texture Mapping." INRIA-Rocquencourt. pp. 1-8.
Kari Pulli. "Fast Rendering of Subdivision Surfaces." University of Washington.

*Primary Examiner*—Wesner Sajous
(74) *Attorney, Agent, or Firm*—Staas & Halsey LLP

(57) ABSTRACT

A system that implements a "tangent space brush," allowing a user to paint directly onto a parameterized object, for example a three dimensional object. A tangent space brush projects coordinates from an input device to the world-space point on the surface of the 3D object. A normal is determined at that point and a brush image is projected from that point, along the normal, to the underlying surfaces. The system is implemented by providing a system that implements selecting a selected area of a displayed object, and projecting a brush directly onto a surface of the selected area.

3 Claims, 21 Drawing Sheets

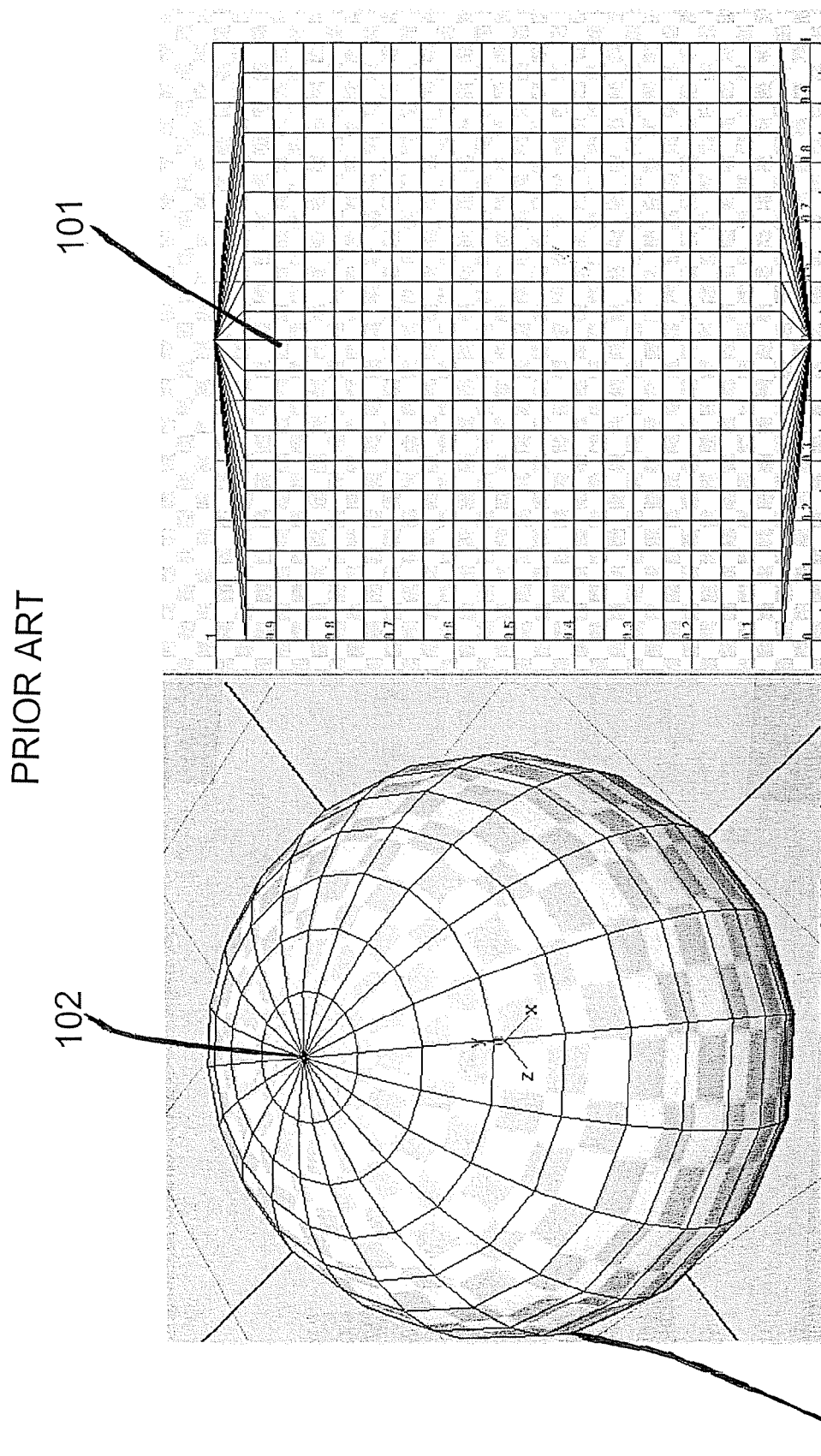

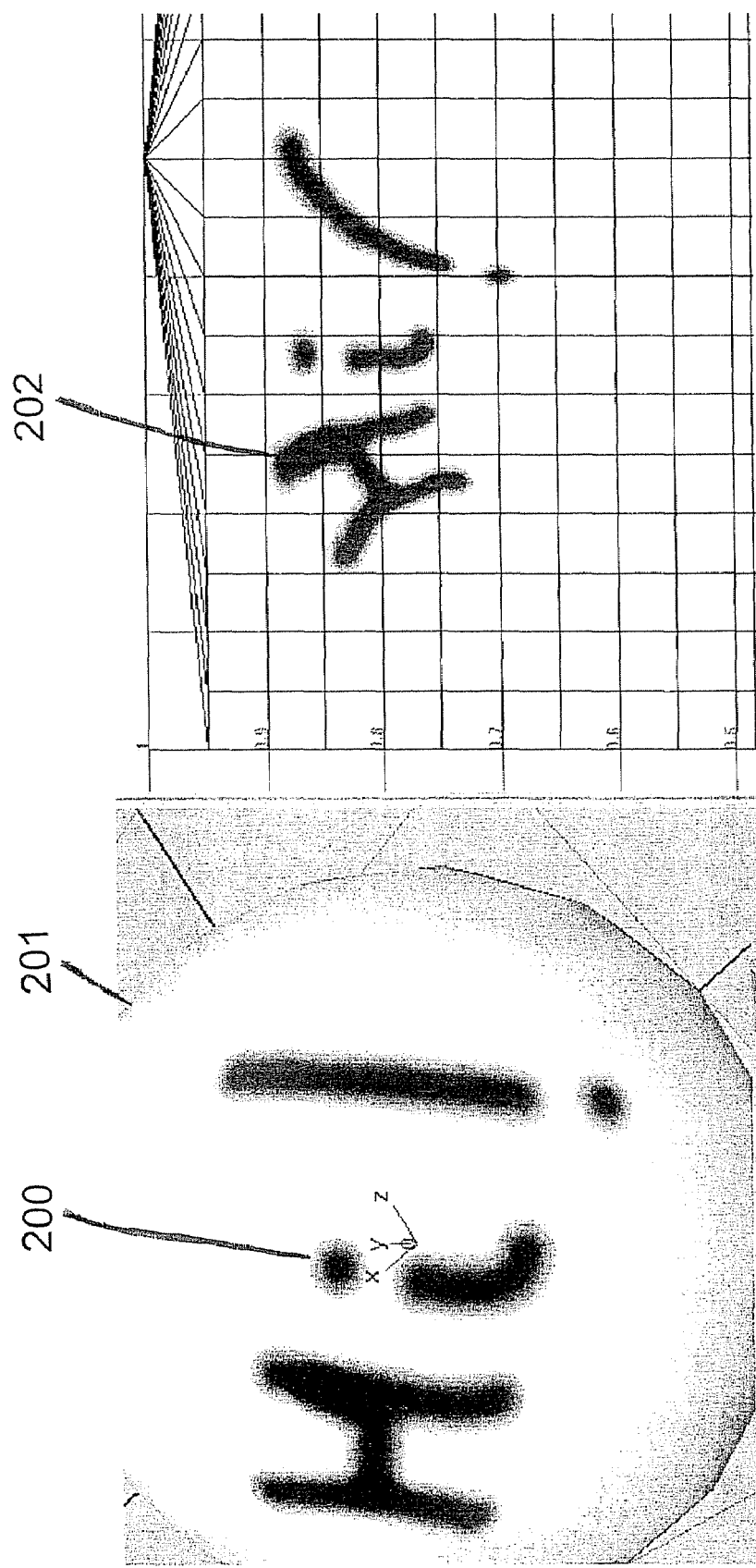

FIG. 4
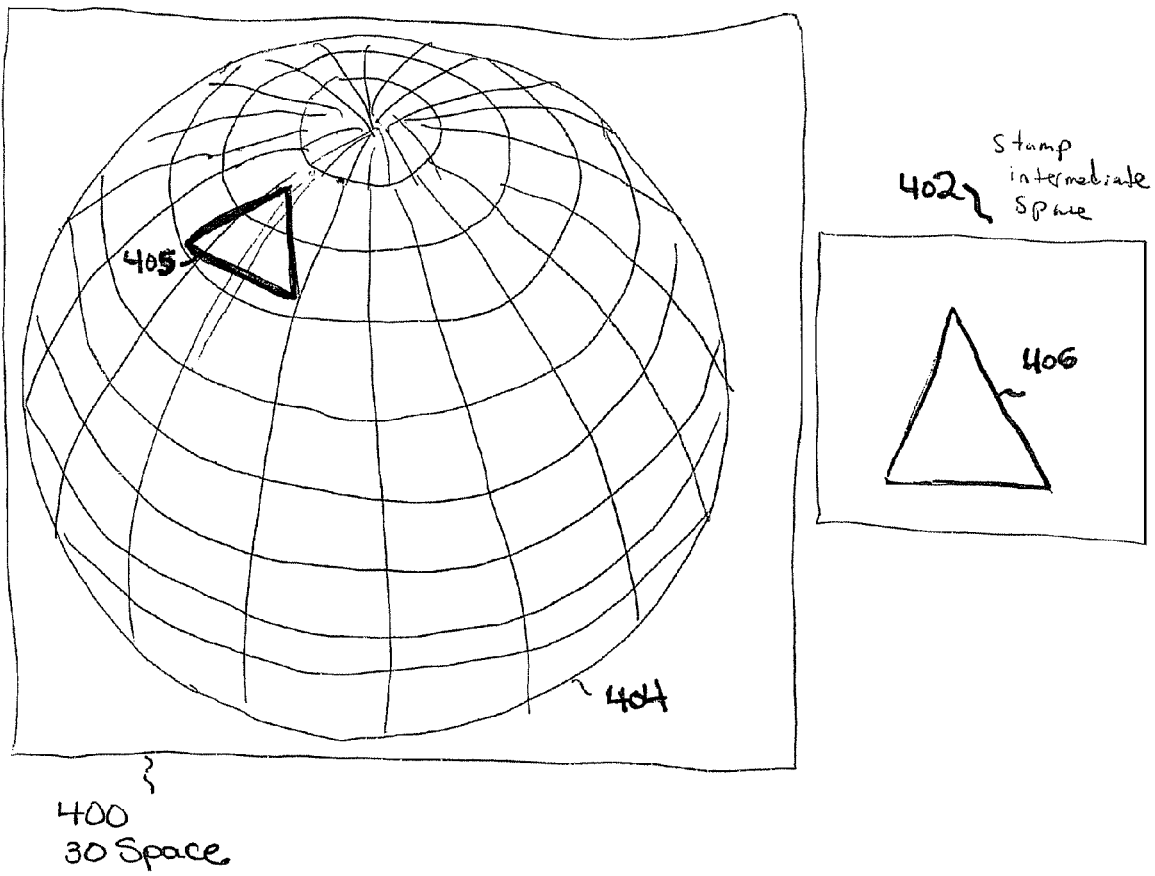
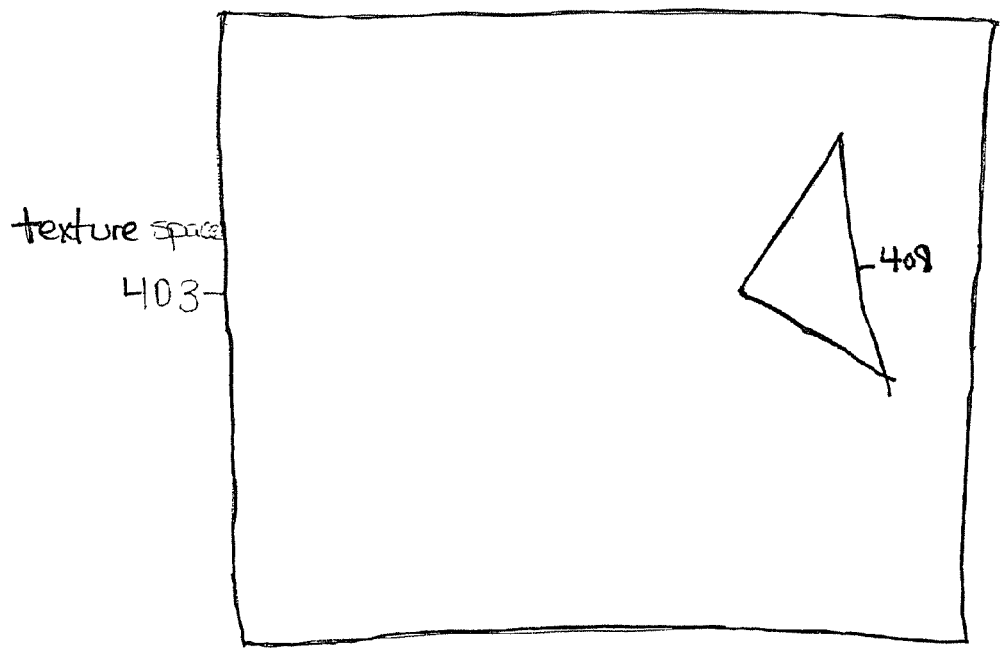

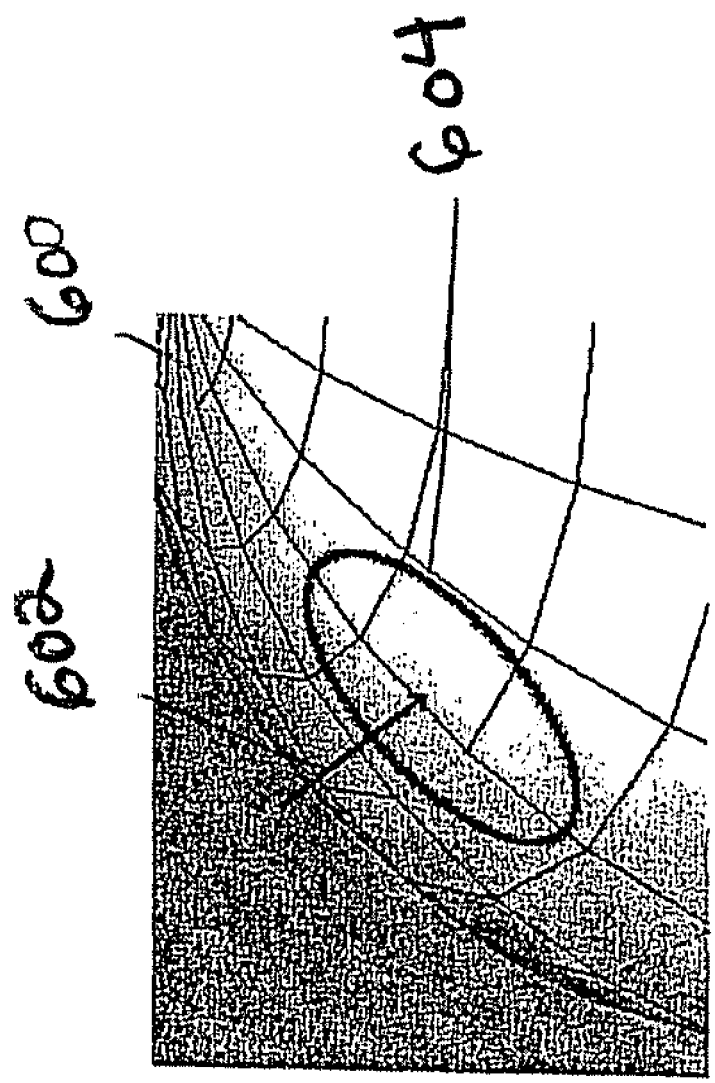

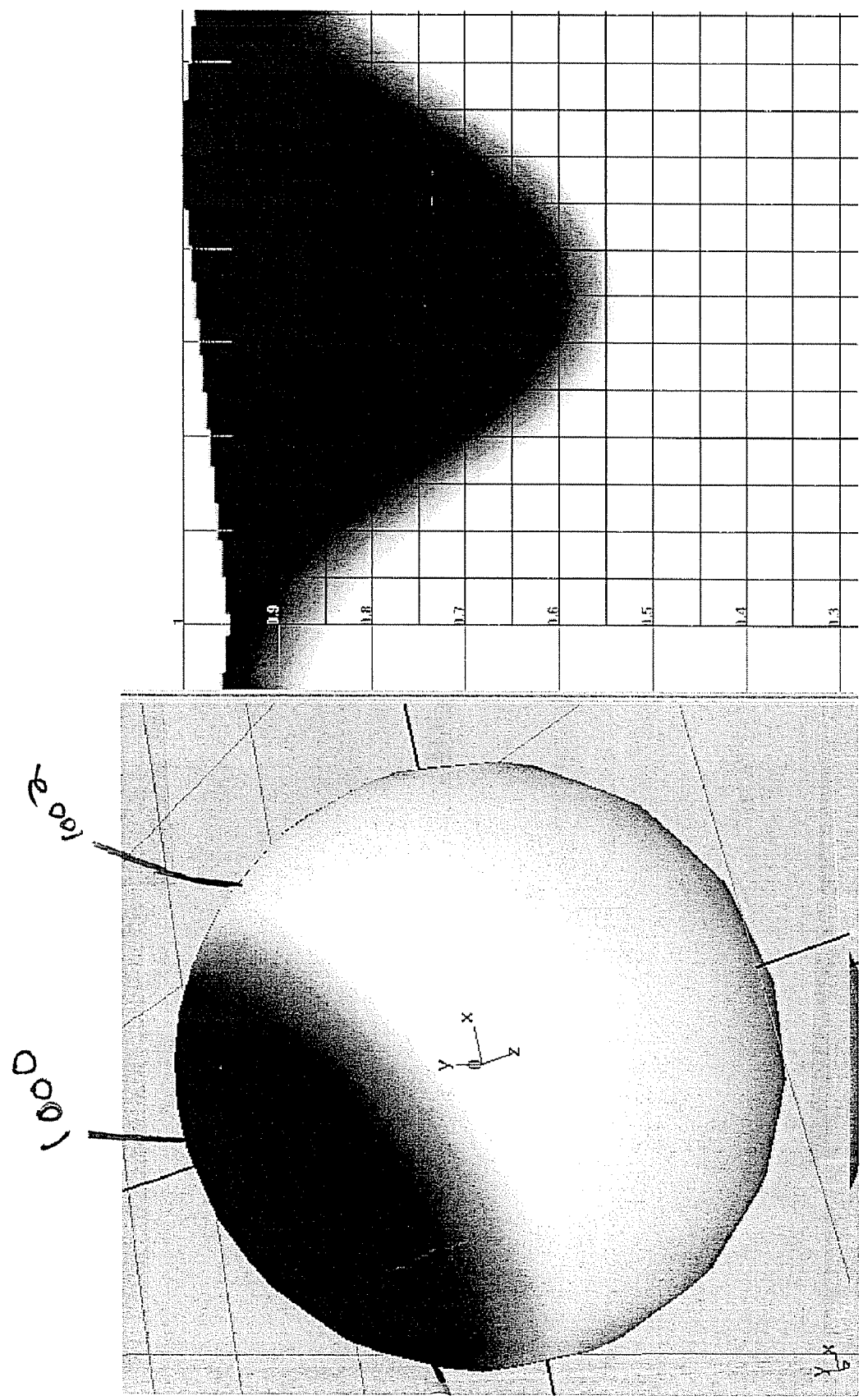

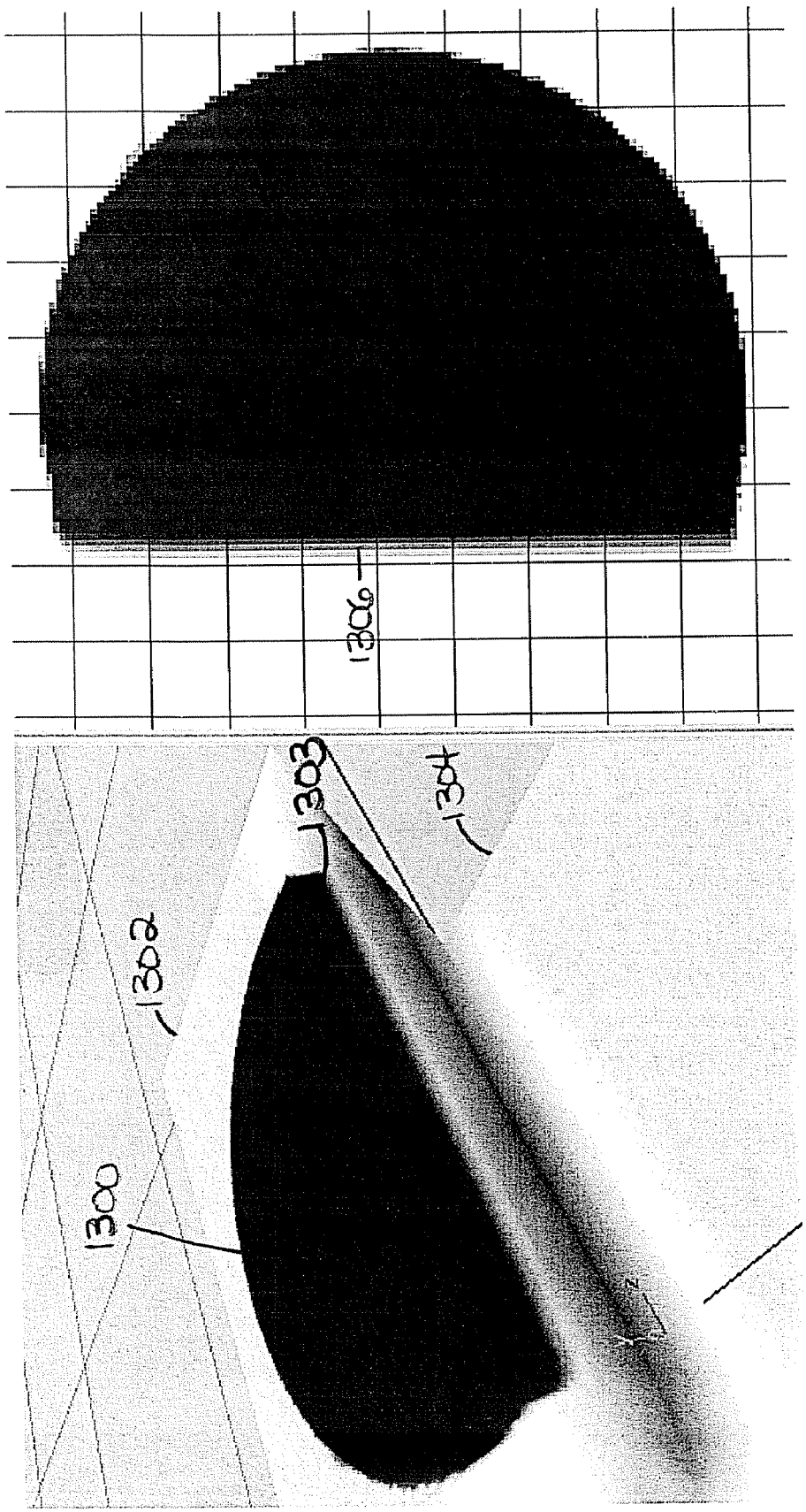

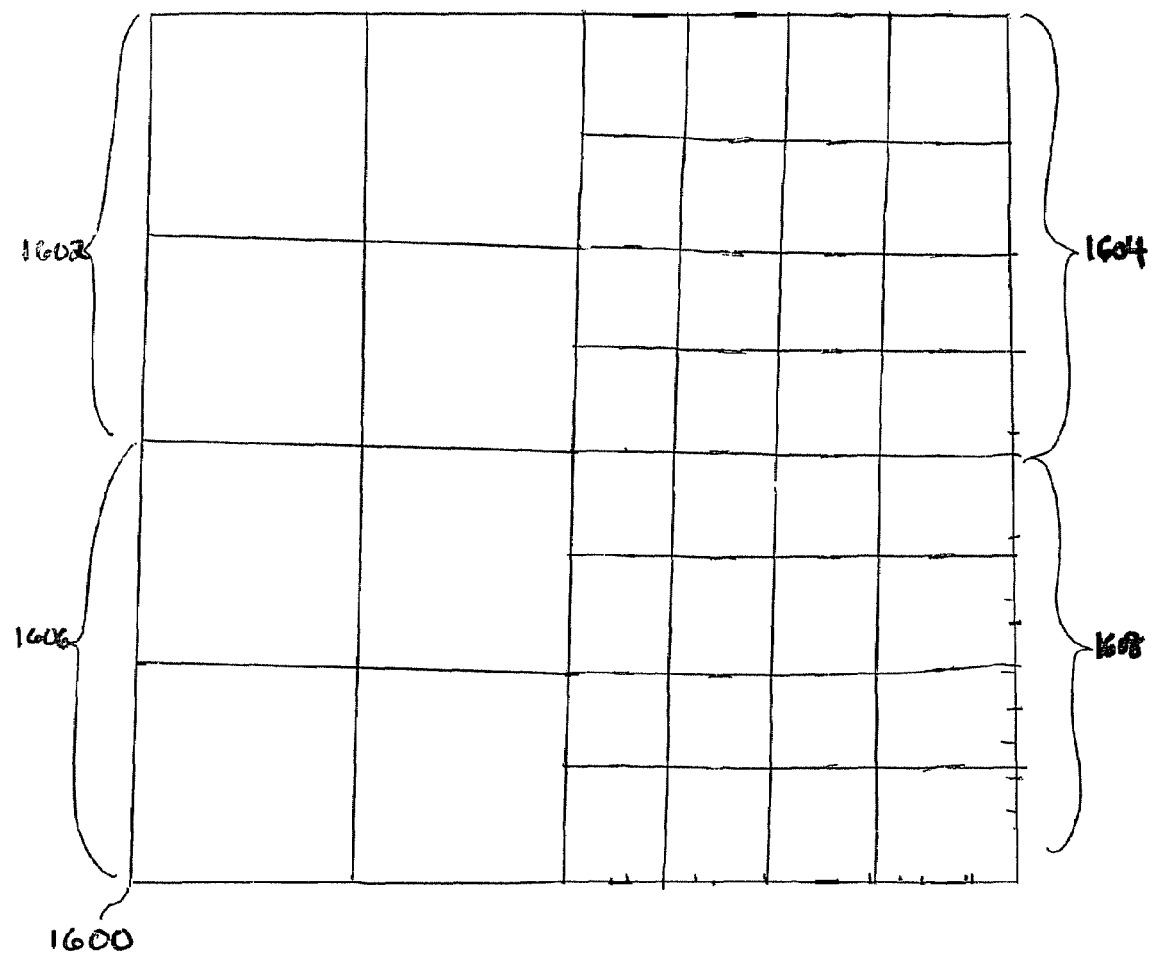
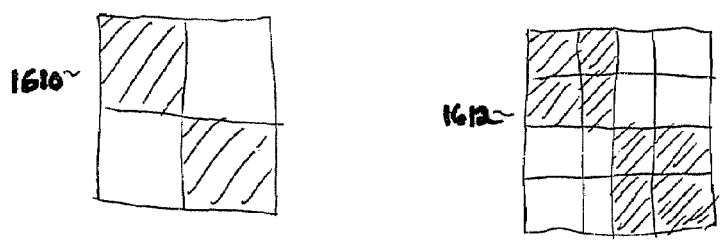
FIG. 16

Second step traverses the mipmap the other way, and assign the coarser level values to the corresponding background pixels.

DYNAMICALLY ADJUSTED BRUSH FOR DIRECT PAINT SYSTEMS ON PARAMETERIZED MULTI-DIMENSIONAL SURFACES

CROSS-REFERENCE TO RELATED APPLICATION(S)

This application is related to and claims priority to U.S. patent application Ser.No. 09/998,919, entitled "Dynamically Adjusted Brush For Direct Paint Systems On Parameterized Multi-Dimensional Surfaces," by Maillot et al, filed Dec. 3, 2001, and U.S. provisional application entitled, "Dynamic Brush Plane: An Easy Way to Apply Image Processing Techniques to 3D Shapes," having Ser. No. 60/306,153, by Maillot et al., filed Jul. 19 2001, and incorporated by reference herein. This application also incorporates by reference the U.S. patent entitled, "Method, System, and Computer Program Product for Updating Texture With Overscan," US. Pat. No. 6,037,948, by Liepa, granted Mar 14, 2000.

BACKGROUND OF THE INVENTION

1. Field of the Invention

The present invention is directed to a tangent-space painting system, offering a high degree of predictability as a brush conforms to an underlying surface curvature. More particularly, the present invention relates to a tangent space brush that paint directly onto the surface of the three dimensional (or higher) object, providing an easy way for a user to paint directly onto a three dimensional object, without having to manipulate a corresponding 2D texture.

2. Description of the Related Art

Typically, when creating virtual 3D objects, it is common to apply 2D images to a 3D surface, helping to simulate the appearance of a real object. This technique, known as texture mapping, provides indirect control over the material parameters of the surface, such as color, shininess, roughness, or even geometrical properties like bumps. The technique known as 3D painting strives to provide direct control over the appearance of the surface. However, a number of technologies are required to support the simulation of painting on a three dimensional physical object using a 2D input device.

The 3D objects used in 3D paint systems are typically "parametric objects." The mathematical definition of a parametric object would be any piece of geometry defined as a collection of subsets of an n-dimensional space, where each subset can be represented by a p variable function F:

F: R pR n
(s, t, . . . )F(s, t, . . . )

In the case of a 3D object, p=2, n=3, and F is the texture mapping function. For a 3D object, we say that the 3D object is a parameterized object, which "lives" in 3D space.

For relatively flat surfaces, and when parameterization is uniform, texture mapping is simple using 2D paint software or scan data. In these cases, manipulating the texture indirectly in 2D suffices. However, in complex scenes and on complex characters, only direct manipulation offers enough usability to achieve the desired results. In typical non-trivial scenes, parameter-space is severely distorted or the geometry shape or topology is unworkable with indirect methods. 3D painting offers direct manipulation by managing non-intuitive mappings for the user.

Several systems simply use a 2D painting system and periodically project the digital painting back onto the 3D object "beneath" the painting. This technique is called screen-space projection as the user effectively "paints" on the screen, which is projected onto a 3D object displayed "behind" the screen. While this approach works well when the object being painted is quite flat and facing the screen (like a piece of paper placed on the screen), it works quite poorly on objects that curve away from the screen (like a sphere) as the projection process smears the painting across the surface. This problem can also be viewed as brush distortion, e.g. a circular brush will produce a distorted elliptical smear of paint on a surface, which moves (or is angled) away from the screen. 3D objects with a complex shape, or complex topology, further complicate the use of a screen-space system due to the restrictions of such a simple projection.

For example, FIGS. 1A and 1B illustrate a prior art method of painting a 3D sphere. FIG. 1A illustrates a three dimensional sphere 100 comprised of polygons. FIG. 1B illustrates a "texture space", which is a 2D texture space corresponding to the sphere illustrated in 3D.

Suppose a user wants to paint a checkerboard pattern onto the sphere. The user can copy a standard checkerboard pattern 101 onto the 2D texture space illustrated in FIG. 1B. Thereafter, the texture space illustrated in FIG. 1B can be projected onto the sphere 100 as illustrated in FIG. 1A.

However, directly transposing the pattern on the 2D texture space onto the 3D sphere results in distortions. For example, see the top pole area 102 of the sphere illustrated in FIG. 1A, which illustrates severe distortions (a swirl appearance) of the checkerboard pattern. Furthermore, the checkerboard square patterns are mapped into long or thin rectangles on the sphere, depending on how far they are from the equator. This was not originally intended.

Other prior art approaches to this problem would perform complex computations onto the already painted 2D texture space to intentionally distort the 2D space (to match the 3D shape) before projecting it onto the 3D shape. However, such approaches are burdensome for the user and time consuming, and also subject to a host of other practical problems including problematic reassembly of the different pieces. On complex objects, this is not even possible to achieve.

Therefore, what is needed is a system that allows a user to paint directly onto the surface of a parametric object living in three dimensions or higher, thereby allowing a user to easily paint on a 3D surface without concern for distortion and without having to first paint in the 2D texture space.

SUMMARY OF THE INVENTION

It is an aspect of the present invention to provide a system that allows a user to paint directly onto a parameterized (or n-dimensional) surface.

It is another aspect of the present invention to provide a system that allows a user to paint using a volumetric brush instead of a flat brush.

It is an additional aspect of the present invention to provide a system that allows a user to paint directly onto a surface of a parametric object using a procedural brush (for example a filter).

It is yet a further aspect of the present invention to provide a system that paints while determining and using a brush defined with an appropriate brush resolution.

It is also an aspect of the present invention to render textures on a surface while reducing artifacts.

It is yet another aspect of the present invention to provide additional features and improvements to parametric painting systems than presently available in the prior art.

The above aspects can be attained by a system that includes selecting an area of a displayed parametric object living in three dimensional or higher space; and painting a brush directly onto a surface of the area.

More particularly, the above aspects can be attained by a system that implements a "tangent space brush." A tangent space brush is first positioned onto a surface using any conventional input device. For example, 3D input devices define a point in space, which can be associated with the closest point on the surface. 2D input devices like a tablet or a mouse can define a point on the surface by intersecting the view ray that goes through the current screen location with the 3D surface. Any other method to interactively define a point on the surface is equally valid.

The brush is then aligned with the tangent space at the said surface location, so that the brush normal equals the local surface normal. The tangent space mapping is defined by the projection along the brush normal. Each point P(x, y, z) of the surface corresponds to a point B(s, t, h) in the brush space (where s and t lie in the tangent space, and h is measured along the normal). The point P is also associated with a point T(u, v) in texture space, using conventional texture coordinates.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1A illustrates a three dimensional sphere comprised of polygons;

FIG. 1B illustrates a "texture space", which is a 2D texture space corresponding to the 3D sphere illustrated in FIG. 1A;

FIG. 2A illustrates one example of painting directly onto a 3D surface, according to one embodiment of the present invention;

FIG. 2B illustrates the 2D texture space corresponding to the sphere illustrated in FIG. 2A, according to one embodiment of the present invention;

FIG. 4 is a block diagram illustrating three different areas of memory that store the 3D space, the texture space, and the stamp intermediate space, according to one embodiment of the present invention;

FIG. 6 illustrates one possible example a tangent space cursor, according to one embodiment of the present invention;

FIGS. 10A and 10B also illustrate the sphere of FIGS. 9A and 9B, according to one embodiment of the present invention;

FIGS. 13A and 13B illustrate another example of normal clipping, and the texture space, respectively, according to one embodiment of the present invention;

FIG. 16 illustrates a two dimensional texture map 1600, but which uses different resolutions, according to one embodiment of the present invention;

DETAILED DESCRIPTION OF THE PREFERRED EMBODIMENTS

The present invention is directed to a system that allows a user to paint directly onto a surface of a parametric object (for example a 3D object), without concern for distortion caused by projecting from a 2D texture space.

While the description herein generally describes and illustrates parametric objects living in three dimensions, the present application is applicable to n-dimensional surfaces (where n is any number). For example, an animated object can be considered as a four dimensional surface (x, y, z, time). All of the concepts described herein can be applied to any number of dimensions using conventional methods such as differential geometry.

FIG. 2A illustrates one example of painting directly onto a 3D surface. The image of FIG. 2A was created by starting with a plain white sphere 201. The sphere can be created by using any known three-dimensional surface creation technique, for example subdivision surfaces, NURBS, polygons, etc. In this particular example, a circular black brush (or "stamp") was chosen, but any defined stamp/color can be used. The letters "Hi!" 200 were painted directly onto the sphere 201 of FIG. 2A by using a mouse, although any input device can be used. FIG. 2B illustrates the conventional 2D texture space corresponding to the sphere 201 illustrated in FIG. 2A. Note the distortion of the letters "Hi!" 202 in FIG. 2B. According to the present invention, since the user paints directly onto the three-dimensional surface illustrated in FIG. 2A, the user is not required to be concerned with the 2D texture space.

Note that the image displayed in FIG. 2A is view independent. In other words, the user can choose any arbitrary angle to view the image that the user desires, and the three dimensional image is constructed accordingly. Either the viewpoint can be changed, or the image rotated as desired by the user.

Figures 3A, 3B:
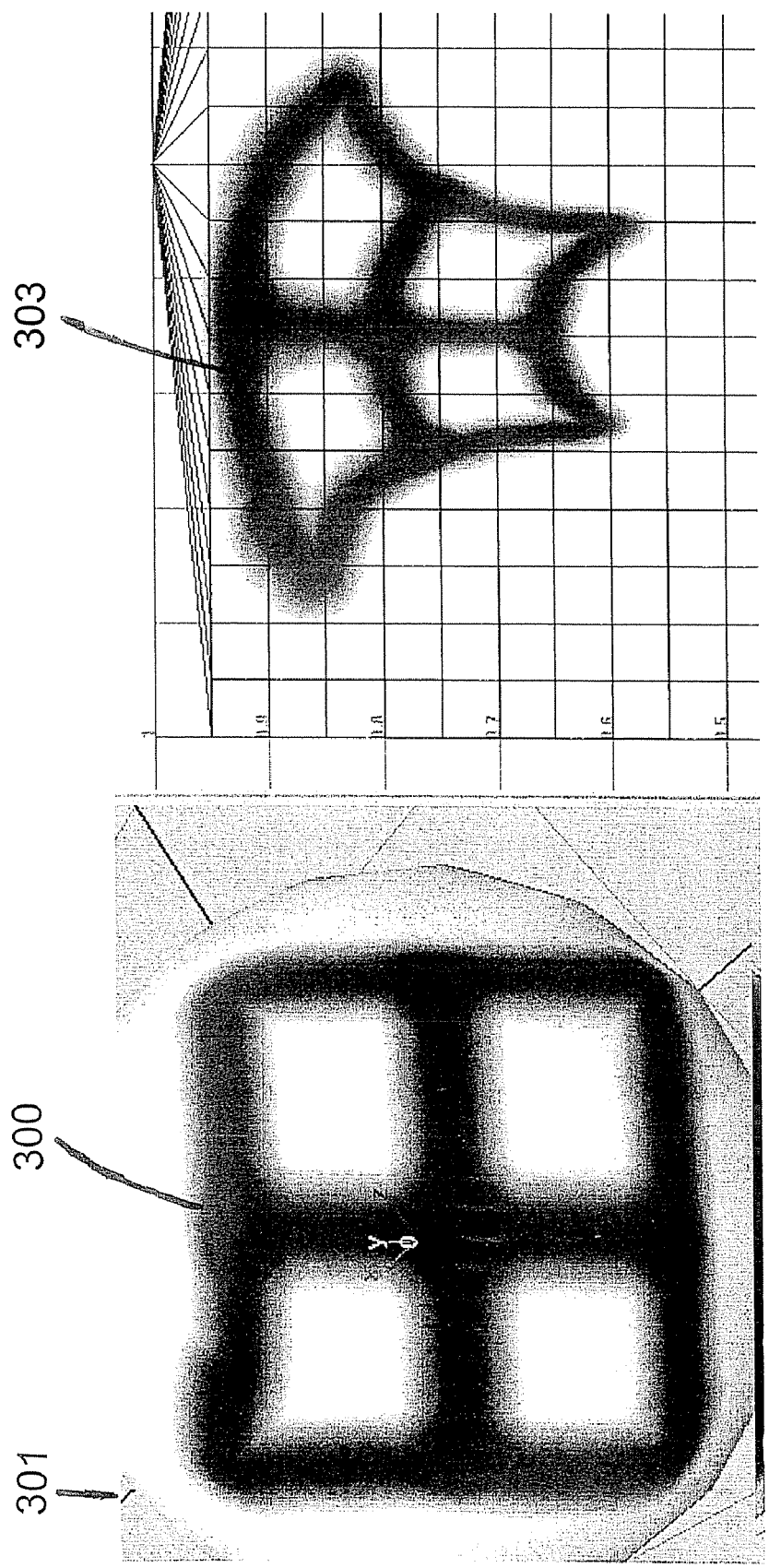
FIG. 3A illustrates another example of painting directly onto a 3D surface, according to one embodiment of the present invention.
FIG. 3B illustrates the 2D texture space corresponding to the sphere illustrated in FIG. 3A, according to one embodiment of the present invention.

FIG. 3A illustrates another example of painting directly onto a 3D surface. The image of FIG. 3A was created by starting with a plain white sphere 301. A circular black brush (or "stamp") was chosen. The checkerboard pattern 300 was painted directly onto the sphere 301 by using a typical two-dimensional mouse. FIG. 3B illustrates the 2D texture space corresponding to the sphere illustrated in FIG. 3A. Again, as in FIG. 2B, note the distortion of the checkerboard pattern 303 in texture space in FIG. 3B, compared to the image of FIG. 3A.

FIG. 4 illustrates three different areas of memory stored in a computer that store the 3D space 400, a stamp intermediate space 402, and a texture space 403, where the 3D space 400 stores the 3D object, in this case a sphere 404, typically comprising polygons. The 3D object can be made using any method of making 3D object, for example (but not limited to) subdivision surfaces and NURBS. A triangle shape 405 is painted onto the sphere 404. These areas in memory store these items as conventionally done using a conventional 3D paint program.

The stamp intermediate space 402 stores the actual shape of the stamp (or brush). The shape of the stamp can be any shape, such as square or round, and can be "transparent" except for the actual pixels used so that when the stamp is applied (or projected) any remaining texture associated with a transparent area of the stamp remains the same. A plurality of different stamps can be created and stored in memory simultaneously. This particular stamp 406 stored in the stamp intermediate space 402 has a triangle shape.

The texture space 403 stores textures to be mapped onto the 3D sphere 405. A triangle texture 408 is mapped onto the triangle 405 on the sphere 404. The texture space 403 corresponds to what is illustrated in either of FIG. 2B or 3B.

Figure 5A:
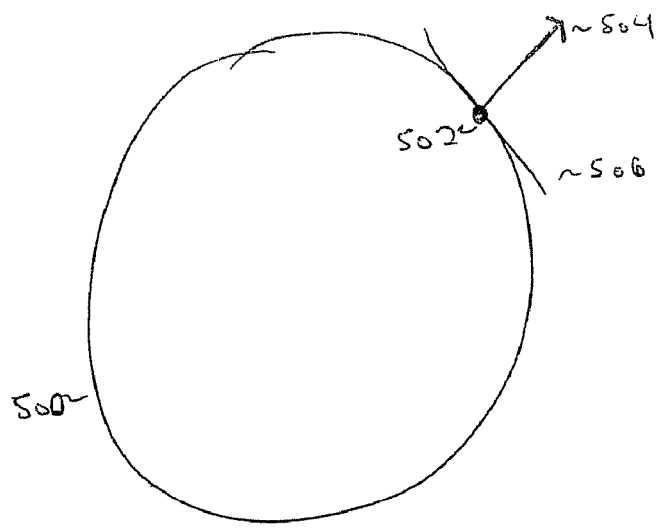
FIG. 5A is a block diagram illustrating concepts used in painting on a 3D surface.

FIG. 5A is a block diagram illustrating concepts used in painting on a 3D surface. A circle 500 exists in two-dimensional space, and a tangent plane 506 intersects the circle 500 at a hit point 502 in the circle 500. Also illustrated is a normal 504 to the hit point 502. The tangent plane 506 is perpendicular to the normal 504. A stamp (or brush) can be projected onto the tangent plane to paint on the circle (more on the projection below). While FIG. 5A is illustrated in two dimensions, the same concepts are applied using the normal 504 in three dimensions in the present invention.

Figure 5B:
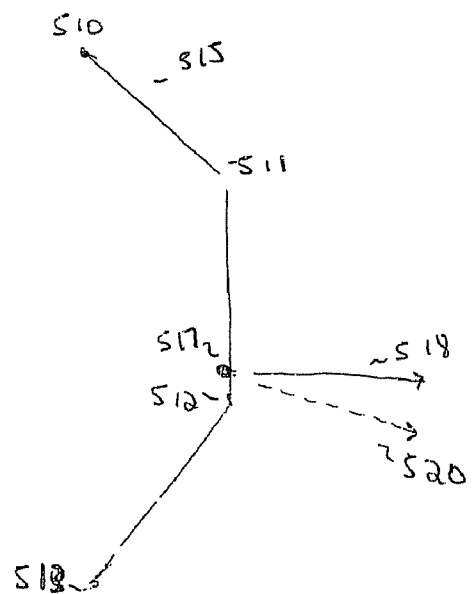
FIG. 5B illustrates the concept of an interpolated normal vector.

FIG. 5B illustrates the concept of an interpolated normal vector. In the forthcoming description, when a normal vector is computed it can either be a standard normal vector, or an interpolated normal vector. In some cases, an interpolated normal vector is used to improve accuracy. Points 510, 511, 512, and 513 define three connected lines which can represent the underlying polygonal surface onto which paint is to be applied, or the points can represent vertices for a spline curve based surface such as a NURBS surface. The standard normal vector computed at an arbitrary point 517 would be normal vector 518. This is because point 517 lies on the line between points 511 and 512, of which the normal vector 518 would be perpendicular to the line. On the other hand, an interpolated normal vector can provide a more accurate normal vector for purposes of projections onto a NURBS surface. The interpolated normal vector 520 points closer to the bottom because the interpolated normal vector 520 is closer to point 512 then point 511. An interpolated normal vector can be computed in numerous conventional ways, in either 2D or 3D.

In order to paint on a three-dimensional surface, first an input device inputs coordinates. These coordinates are projected to the world-space point on a surface of the 3D object. A normal is determined at that point and a brush image, positioned on a tangent plane, is essentially projected to that point, along the normal, onto the underlying surfaces. Thus, a user can paint using a "tangent space cursor" on the surface of a 3D object.

FIG. 6 illustrates one possible example a tangent space cursor. A 3D sphere 600 is pictured. The user, by manipulating a 2D pointing device can point to points in 3D space (not pictured), and a normal vector 602 and a tangent space 604 defined by the size of the brush can be computed. The curved surface under the tangent space 604 is painted.

FIGS. 7A, 7B, 7C and 7D illustrate in more detail how painting directly on a 3D surface is accomplished, according to one embodiment of the present invention.

Figure 7B:
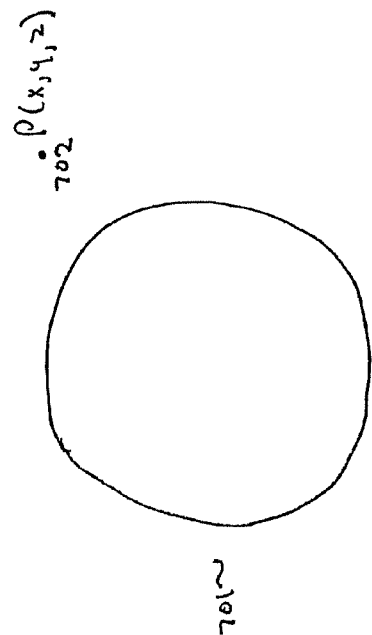
FIGS. 7A, 7B, 7C and 7D illustrate in more detail how painting directly on a 3D surface is accomplished, according to one embodiment of the present invention.
Figure 7D:
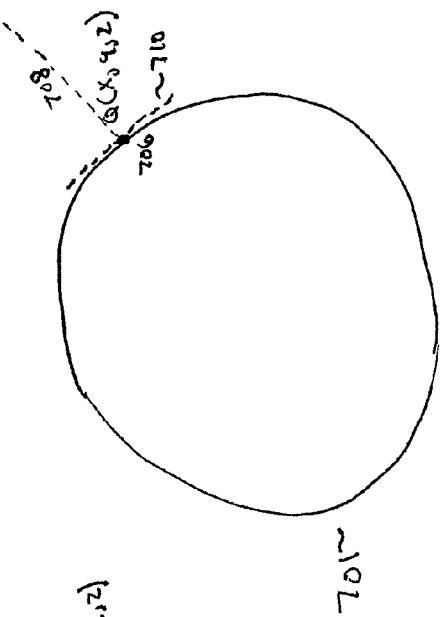
Figure 7A:
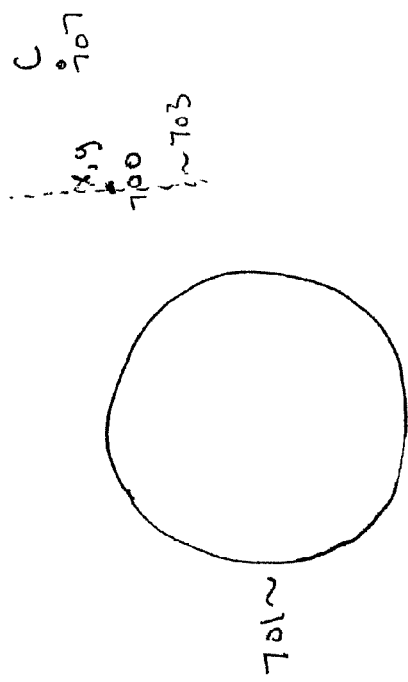

FIG. 7A illustrates a 3D sphere 701 and a selected x, y coordinate. The x, y coordinate is on a screen plane 703, from which a camera point 707 views the sphere 701.

FIG. 7B illustrates that the selected (x, y) coordinate 700 is mapped to a 3D screen space point P(x,y,z) 702. The mapping is made by a linear transformation of the input device coordinates to screen-space coordinates, and then the screen space coordinates are mapped to the 3D viewing frustum.

Figure 7C:
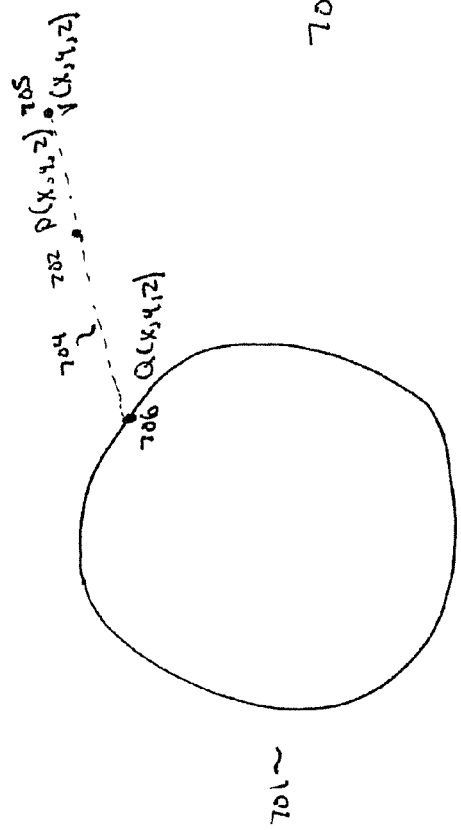

FIG. 7C illustrates a ray 704 that is generated into the frustum. The ray 704 is formed by connecting a viewpoint V(x,y,z) 705 with the screen space point P(x,y,z) 702 and it is tested for intersection with the sphere 701. The closest 3D intersection point Q (x,y,z) 706 (or hit point) is calculated.

FIG. 7D illustrates a normal 708 to the intersection point Q(x,y,z) 706. A normal to the intersection point Q(x,y,z) 706 is calculated which determines the tangent plane 710 which is perpendicular to the normal 708 and intersects the intersection point 706 Q(x,y,z). The normal that is calculated can also be an interpolated normal (as discussed above). The paint stamp or brush is positioned on the tangent plane 710.

To paint the polygonal surface of the 3D object, the polygons that lie under (or within the area of influence of) the brush need to be determined and the part of the polygons covered (or to be painted) by the brush determined. To do this the system defines a tangent plane brush using the tangent plane and the brush radius (and depth) mapped into the tangent plane. The polygons of the surface are then identified by projecting the polygons to the tangent plane. Portions falling outside of the world-space brush are identified and essentially clipped by applying the tangent plane normal's inverse transformation to the vertices. This simplifies the projections by the vertex-z value becoming zero. Note that S and t define the projection into the tangent space, h the distance to the plane. For a single point, clipping happens when (s, t) are outside the brush radius (or fall into a fully transparent area of the brush) or when h exceeds the brush depth. For a triangle, clipping happens when all points in the triangle are clipped. A simple conservative test using only bounding boxes calculations can be used to quickly reject invalid triangles.

Figure 8:
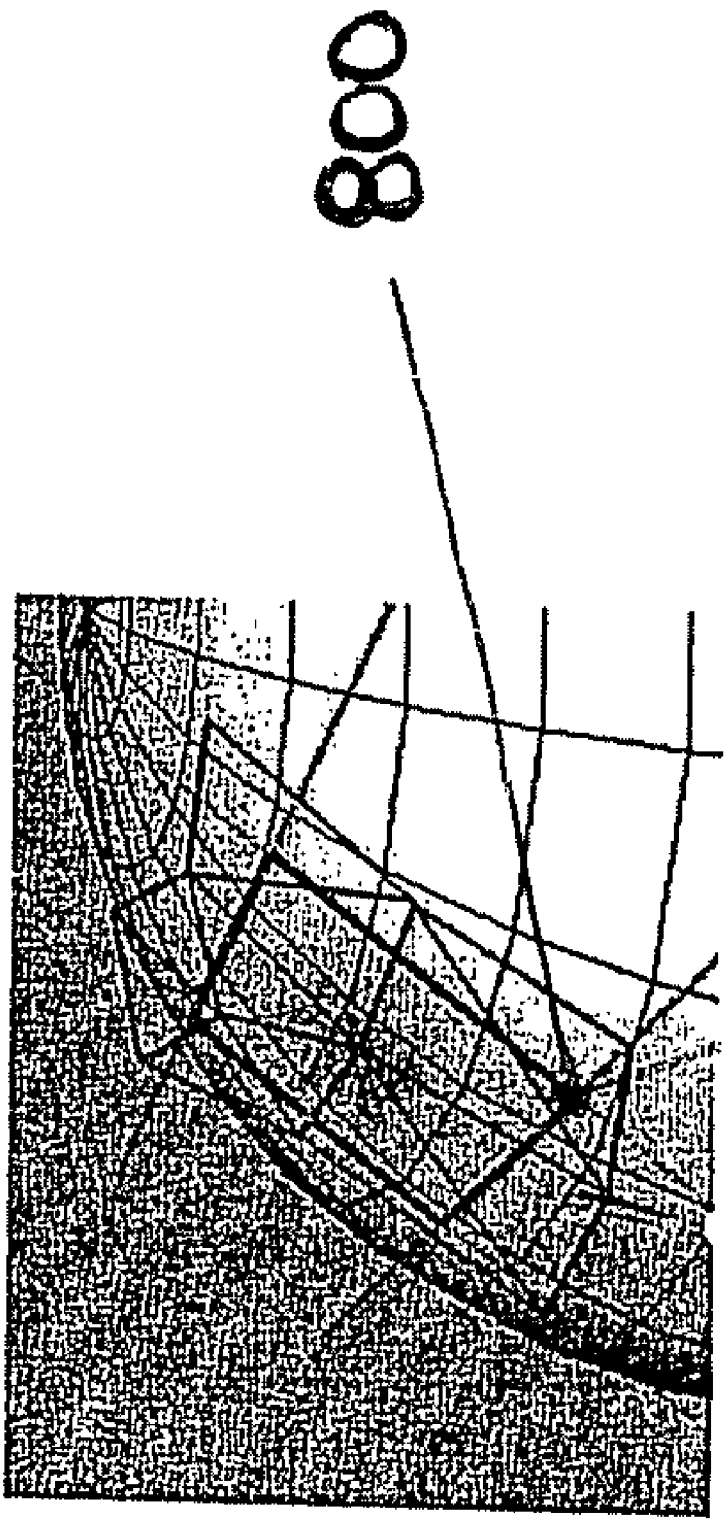
FIG. 8 illustrates the projection of a surface to the tangent plane, according to one embodiment of the present invention.

FIG. 8 illustrates the projection of a surface to the tangent plane. The tangent plane pattern 800 can be rendered into the object's texture space using the texture coordinates specified by the projected triangle from the object's original texture mapping, for each projected triangle (or other polygon). After the polygons under the brush to be painted are determined (as discussed above), they can be rendered by mapping the brush texture onto the surface texture. For triangles, this is a simple conventional mapping. Solving the texture mapping problem using a tangent space brush amounts to layered texture mapping from the brush texture to the surface texture. A number of methods can be used for this mapping, and the mapping can utilize any existing triangulation. The triangles can then be converted pre-computed barycentric coordinates. Using point sampling, a conventional fast feedback version of the texture can be supplied.

Note that typically, the brush should typically be small with respect to the curvature of the surface. Otherwise, the brush may be distorted when it is mapped via the tangent plane normal to the surface.

Figures 9A, 9B:
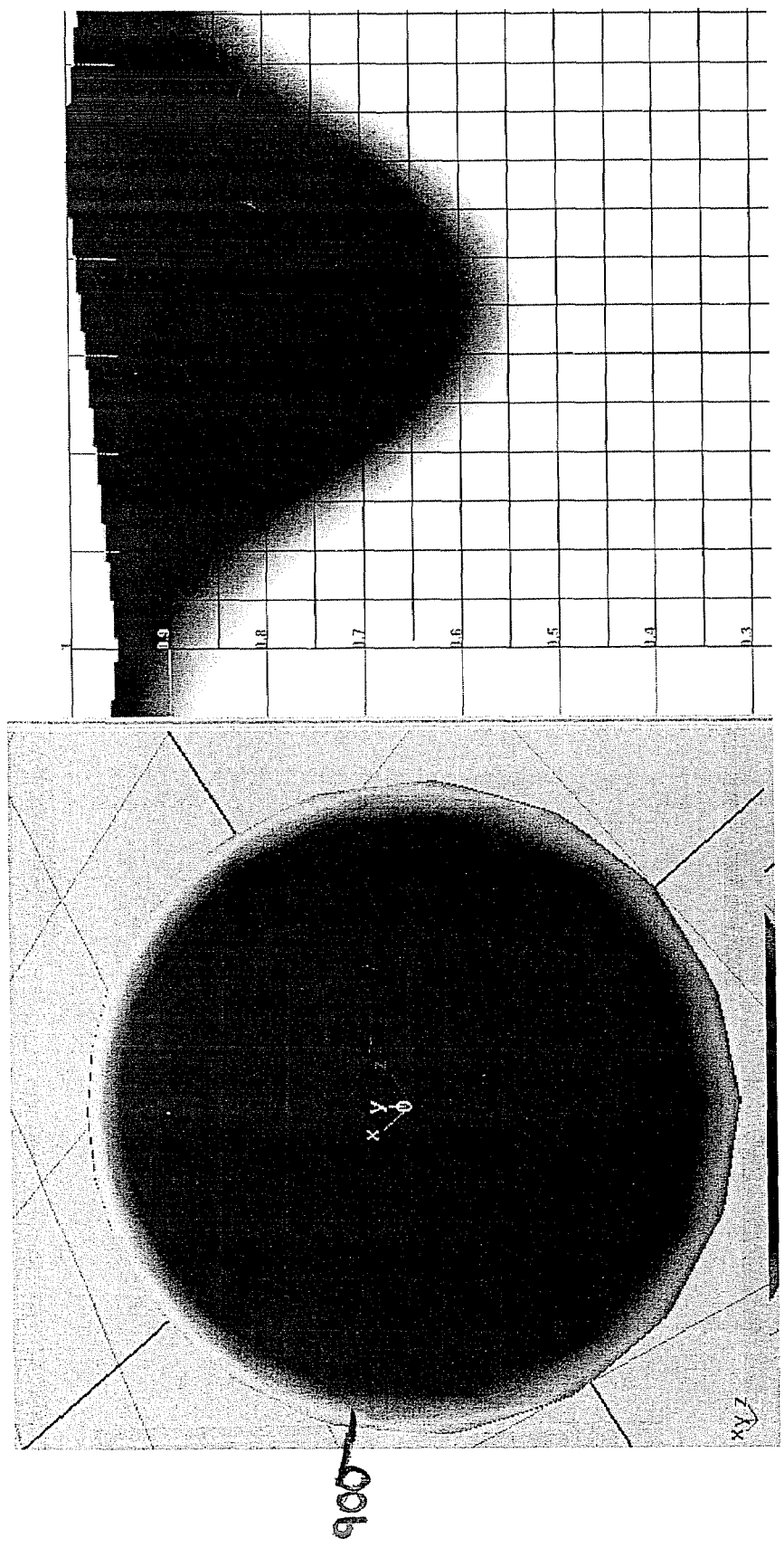
FIGS. 9A and 9B illustrate painting of a sphere with a circular stamp, according to one embodiment of the present invention.

FIGS. 9A and 9B illustrate the painting of a sphere 900 with a circular stamp. FIG. 9A illustrates the sphere 900 painted with one application of a circular stamp. The stamp is placed directly in front (or where the viewpoint is) of the sphere 900. FIG. 9B illustrates the texture space mapping of the sphere illustrated in FIG. 9A. In this example, the stamp covers the pole of the sphere, where the texture coordinates introduce a lot of distortions and some discontinuities. Previous art methods could not easily paint a round brush on the sphere. Notice how the texture 9B must me distorted to produce the correct round stamp.

FIGS. 10A and 10B also illustrate the sphere 900 of FIGS. 9A and 9B. FIG. 10A illustrates the sphere painted as described above with regard to FIG. 9A, but from a different viewpoint (or in the alternative after rotation of the sphere). FIG. 10B illustrates the texture space of FIG. 10A.

FIG. 10A illustrates how (in one embodiment of the present invention), the normal vector of the surface being painted can affect the intensity of the paint applied to the surface. The center of the applied stamp 1000 is dark black, while the edges 1002 are gradually lighter. This effect can be used to increase the realism of the application of the stamp.

By analogy, spraying spray paint directly onto a sphere would produce a similar effect. The intensity of the paint can be gradually varied responsive to the angle between the tangent plane normal and the surface normal. For example, the intensity can be inversely proportional to the angle between normals. Where the paint is the lightest on the sphere 1002, the difference in normal vectors of the surfaces of the sphere and a hit point normal vector approaches 90 degrees. When the difference in normal vectors is greater than 90 degrees, painting on the surface can stop completely. One particularly intuitive mode consists in painting with full intensity for angles below a certain threshold A, and progressively using less paint when angle varies between A and 90 degrees. Parameter A can be set to adjust the desired effect. Many other response functions that map the angle to an intensity factor between 0 and 1 could be used also.

Brushes (or stamps) can also be three dimensional instead of the typical two-dimensional stamp. A three dimensional shape of a brush can be cylindrical, although they can be made into other three dimensional shapes as well, such as spherical, rectangular, or any arbitrary three dimensional shape. The simplest implementation consists in a single brush image I(s, t) and a profile curve d(h), defining a generalized cylinder. The profile curve determines the depth of the volumetric brush. The paint intensity is defined by the product I(st)d(h). An intuitive profile curve could be a smooth function which is 0 outside of and a smooth interpolation in and Using a three dimensional brush can result in more realistic effects when painting directly onto a three dimensional surface. Parts of the 3D surface may be painted even when far for the brush center, because they would project close to the center of the brush. This is unintuitive for most users, and defining a finite brush depth solves the problem.

Figure 11B:
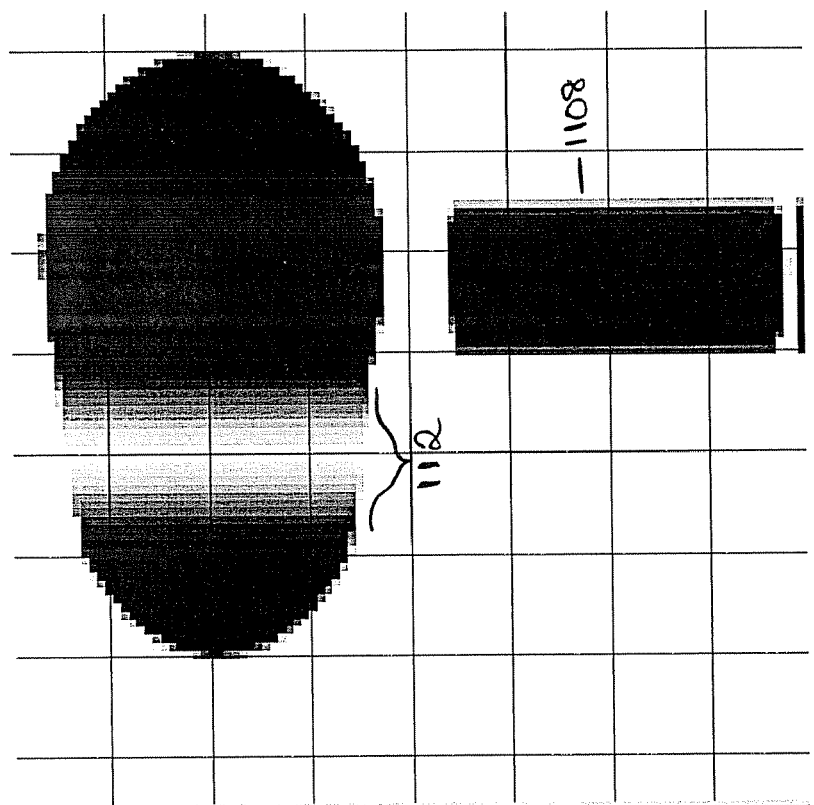
FIGS. 11A and 11B illustrate the results of using a two dimensional and a three dimensional stamp, according to one embodiment of the present invention.
Figure 11A:
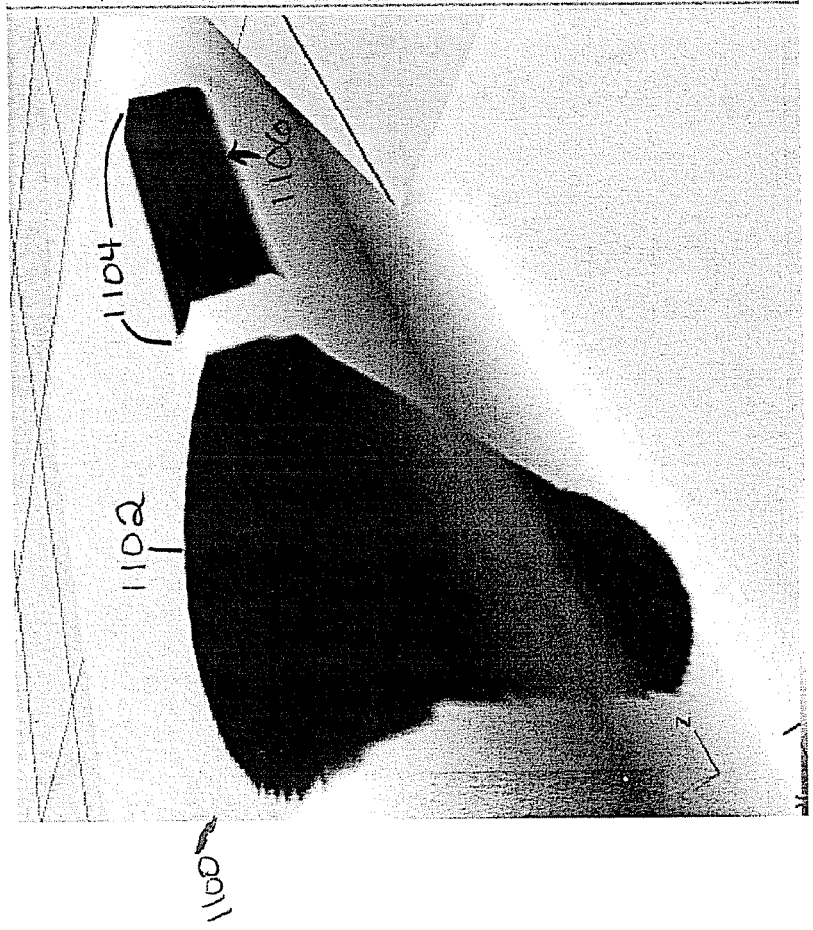

FIGS. 11A and 1B illustrate the results of using a two dimensional brush and a three dimensional brush. FIG. 11A illustrates a folded three dimensional surface 1100 with a first area 1102 painted by a flat round stamp and a second area 1104 painted by a volumetric cylindrical stamp. FIG. 11B illustrates the texture space for the surfaces illustrated in FIG. 11A.

Note how the second area 1104 painted by the cylindrical brush comes out almost rectangular, and avoids the large leakage visible in 1102. This is because we set the depth value to be small to build a very flat cylinder, and thus clipped the parts of the surface away from the tangent plane. However, note that the edges 1106 of the second area appear lighter before the edges are completely clipped. This is more easily seen in FIG. 11B, wherein the edges 1108 of the second area 1104 appear lighter. This is because, as discussed above, the intensity of the stamp projection can vary depending on the normal vector of the surface being painted.

Figure 12B:
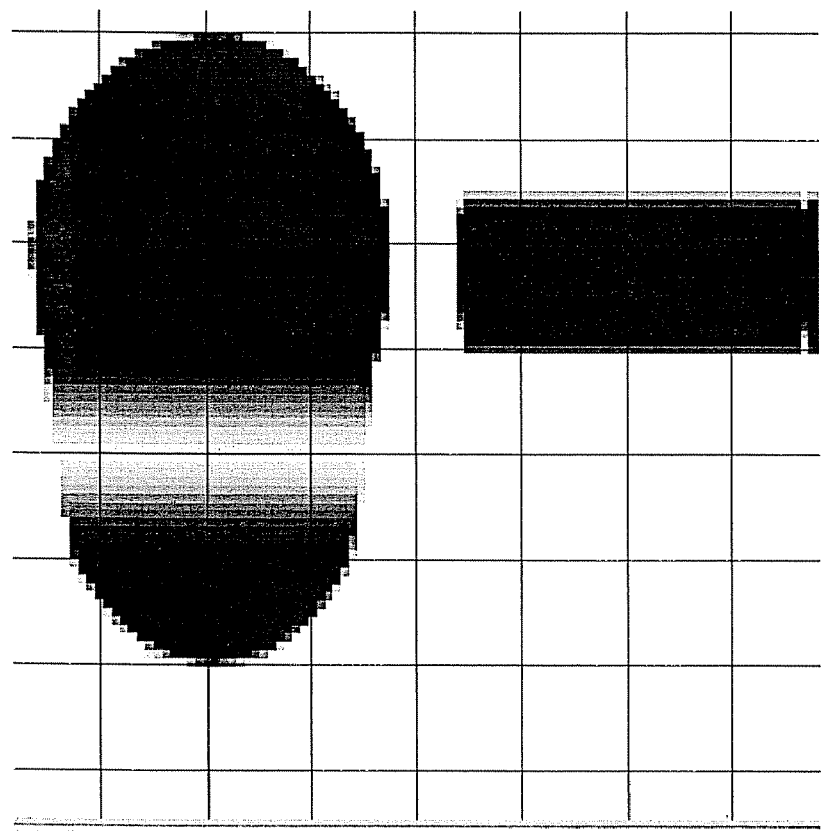
FIGS. 12A and 12B illustrate a top view of FIG. 11A and the texture space, respectively, according to one embodiment of the present invention.
Figure 12A:
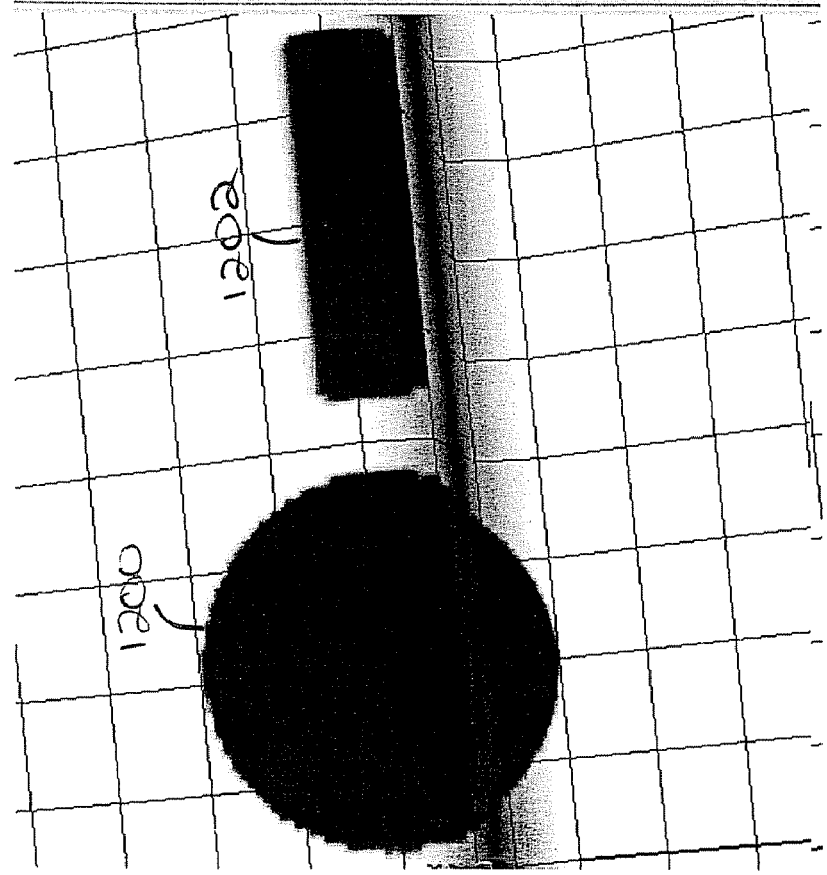

FIGS. 12A and 12B illustrate a top view of FIG. 11A and the texture space, respectively. The first area 1200, painted by the two dimensional brush, was painted from the same angle as the viewpoint in FIG. 12A. The round (or cylindrical) shape of the stamp can be clearly seen. The second area 1202, painted by the three dimensional stamp, appears rectangular because of the distance clipping described above.

Thus, using a three dimensional brush allows a user to paint directly onto the three-dimensional surface, while producing a more precise effect than a two dimensional brush.

FIGS. 13A and 13B illustrate another example of normal clipping, and the texture space, respectively. The brush used to create the area painted 1300 on the top surface 1302 could have either been a two dimensional brush or a three dimensional cylindrical brush, as the effect would typically be the same In this case, the difference in normal between the hit point normal of the top surface (where the paint is applied) and a normal at an edge 1303 of the surface is very sharp, sharper than a corresponding angle in FIG. 1A. In the case of FIG. 13A the difference between normals is greater than 90 degrees, and the clipping stops the projection of the stamp entirely. Thus, unlike the result in the first area 1200 of FIG. 11A, the stamp does not get projected onto the bottom surface 1304. This is so, even though the normal of the bottom surface 1304 is similar to the hit point normal where the paint is applied. Parameters can be adjusted so that the paint would not be clipped on the bottom surface 1304, if the user so desires. In FIG. 11A, the difference between the hit point vector and the surface normal vector did not vary by more than a predetermined amount (in this case 90 degrees). As such, the intensity of the paint was lightened in the intermediate region 1106 where this difference approached 90 degrees, but painting was never stopped completely. In contrast to FIG. 11A, in the case of FIG. 13A, because of the sharp change in normal vectors, the projection of the paint of the brush is stopped entirely.

FIG. 13B represents the texture space of FIG. 13A. Note that the intensity of the paint is lightened in the region before the projection of the brush is completely stopped. This can be more easily seen in FIG. 13B, where an edge region 1306 is lighter. The brief lighter region is due to the change in normal vector before the clipping stops projection of the brush entirely. The intensity can be computer by using a degree 3 polynomial: if a is the angle and a0 is the threshold angle, then if a<a0, then I(a) 1; if I(a)>90, then =0; otherwise I(a)=f(a)/f (a0), with f(a)=(90−a)*(90−a)*(a+(a0+90)/2). Any I(a) function can be used, although I(a)=1 is a simple smooth one.

Figure 14B:
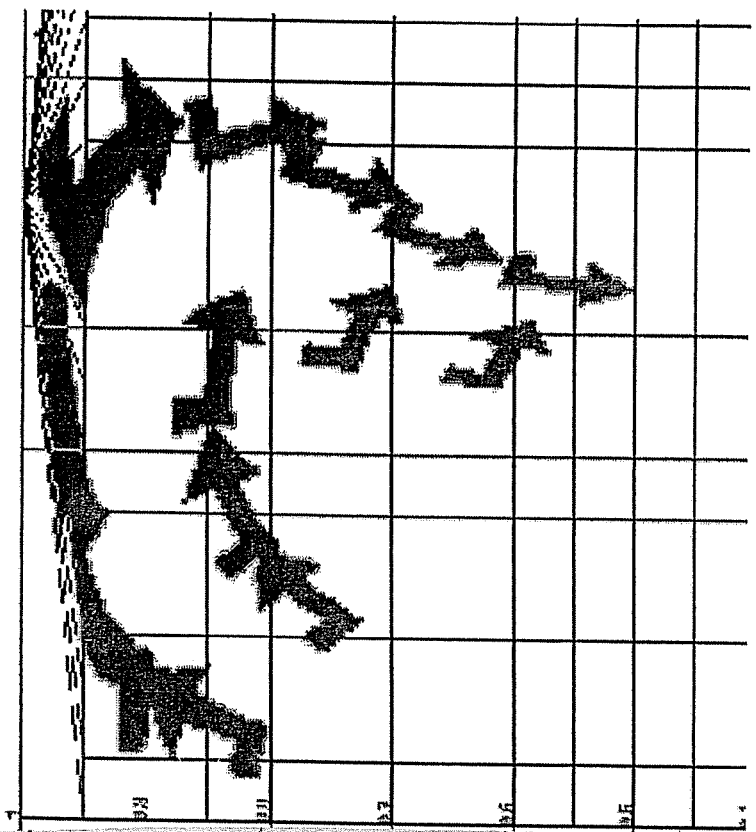
FIG. 14 illustrates how a stamp can be rotated in the direction applied, according to one embodiment of the present invention.
Figure 14A:
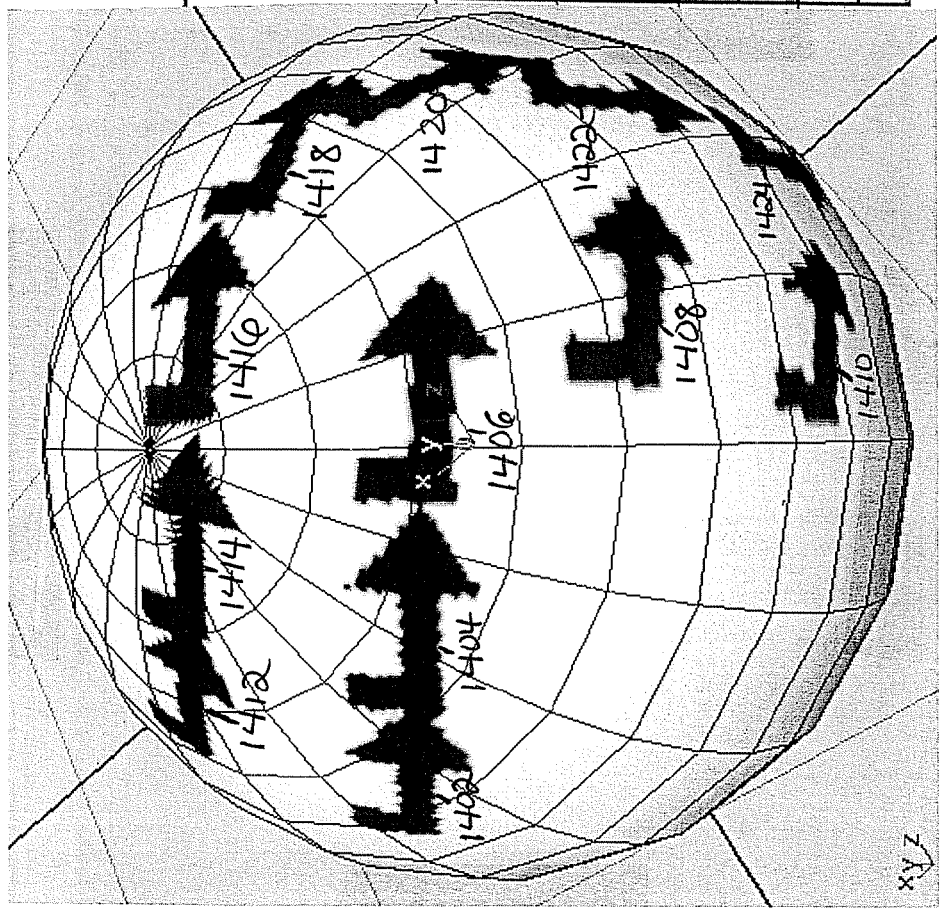

FIGS. 14A and 15B illustrate how a brush (or stamp) can be rotated to match the direction that the brush is moving. In another embodiment of the present invention, a brush (whether two or three dimensional) can be rotated along the normal to follow the direction the stroke is applied.

When a stamp is projected onto a surface, it is typically aligned around the normal vector of the surface onto which it is projected, in order for it to be properly painted onto the surface. Areas 1402,1404,1406,1408, and 1410 were all made in one stroke.

However, the stamp can also be rotated in an arbitrary direction around the normal vector, in effect "pointing" the stamp in a particular direction on the three dimensional surface. The direction the stamp is rotated to match or relate to the direction an arbitrary stroke is being applied. Areas 1412, 1414, 1416, 1418, 1420, 1422, and 1424 were all made in one stroke. However, in this case, the rotation of the stamp corresponds to the direction of the stroke. In this case, the stroke starts out going in the rightmost directions (90 degrees) and then heads downwards (180 degrees). The rotation of the stamp is adjusted to match the direction of the stroke.

The brush stroke direction can be obtained by connecting the different brush centers on the 3D surface. This defines a curve on the surface. The tangent vector to this curve is contained into the tangent plane by construction, and can be used as the s direction of the brush reference frame.

Figure 15:
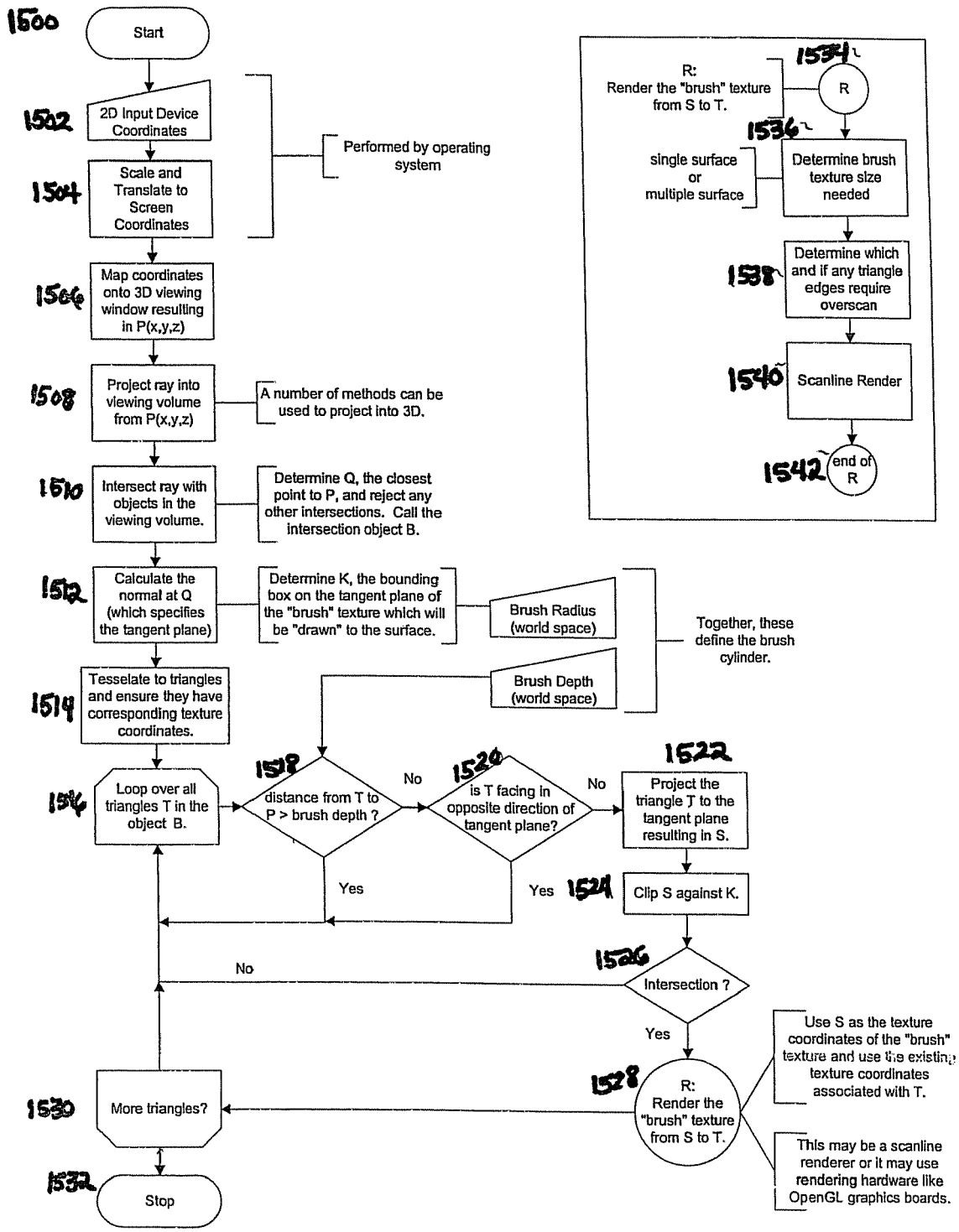
FIG. 15 is a block diagram illustrating the process of painting in tangent space, according to one embodiment of the present invention.

FIG. 15 is a block diagram illustrating the process of painting in tangent space, according to one embodiment of the present invention.

The process starts 1500 by performing any initialization that may be required. The process then inputs 1502 two dimensional device coordinates, typically from a pointing device, such as a mouse. The process then scales and translates 1504 the 2D coordinates into screen coordinates. Then, the process maps 1506 the coordinates onto the 3D viewing window resulting in P(x,y,z) (a three dimensional coordinate).

After the mapping, the process conventionally projects 1508 a ray into a viewing volume from P(x,y,z). Any conventional mathematical method can be used to accomplish this projection. The process then intersects 1510 the ray with objects in the viewing volume. This can be accomplished by determining Q (which is on the object), the closest point to P, and reject any other intersections. The intersection object can be labeled as B.

Next, the process calculates 1512 the normal at Q (which specifies the tangent plane). K is determined, which is defined as the bounding box on the tangent plane of the brush texture, which will be drawn to the surface. K is determined depending on the brush radius and orientation. If a 3D cylindrical brush is used, the cylindrical brush can be defined as including both a brush radius (in world space) and a brush depth (in world space).

Subsequent to the calculating, the process tessellates 1514 (if necessary) the 3D object to triangles and ensures that the triangles have corresponding texture coordinates. The 3D object can be any 3D object, such as a subdivision surface or a NURBS surface, which can then be tessellated.

After the tessellating, the process loops 1516 over all triangles T in the object B. The process checks 1518 to see if the distance from triangle T to P is greater than the brush depth, for each triangle in object B. If the distance is greater, then this triangle is clipped (not rendered) and the process returns to the looping 1516 for the next triangle. If the distance is not greater, the process then checks 1520 to see if T is facing in an opposite direction to the direction of the tangent plane is facing. If T is facing in an opposite direction, the triangle is clipped and the process proceeds back to the looping 1516 operation for the next triangle.

From the checking, if T is not facing in an opposite direction, then the process projects 1522 the triangle T to the tangent plane resulting in S. S is used as the texture coordinates of the brush texture and uses the existing texture coordinates associated with T. The projection can be performed by any conventional method.

After projecting, the process then clips 1524 S against K (the bounding box on the tangent plane). This is the case where a portion of triangle falls inside the brush, and a portion falls outside the brush. Only the portion of the triangle that falls inside the brush inside will be painted.

Next, the process checks 1526 to see if there is an intersection. If there is no intersection, then the process proceeds to the looping 1516 operation and loops to the next triangle.

If the checking 1526 determines that there is an intersection, then the process renders 1528 the brush texture from S to T A conventional renderer can be used to render the brush texture. More on the rendering process will be discussed below.

After the rendering, the process checks 1530 to see if there are more triangles. Either only the triangles connected to the painted ones are considered, or all triangles of the object. The first mode results in faster paint loop, and ensures that a stamp is always painting a connected piece of the 3D surfaces. The second mode is easier to implement, and can be more accurate when the surface is made of several disconnected pieces. If more triangles are found, the process returns to the looping 1516 operation that loops to the next triangle. If the checking 1530 operation determines that there are no more triangles, the process then stops 1532 that finishes the process.

With regard to the rendering 1528 operation, which renders the brush texture from S to T, this operation comprises sub-operations 1536-1542. The sub operations determine 1536 the brush texture size needed (more on this below). Then the process determines 1538 which (if any) triangle edges require overscan (more on this below). The process then performs 1540 scanline rendering. The process then ends 1542, which terminates the rendering process.

In an additional embodiment of the present invention, the brush texture size can be determined and possibly adjusted depending on the resolution of the surface being painted. FIG. 16 is a diagram illustrating one example of a situation where the brush texture size should be changed.

FIG. 16 illustrates a two-dimensional texture map 1600, but one which uses different resolutions. For example the left most side is made of 2.times.2 pieces 1602,1606, while the rightmost side is made of 4.times.4 pieces 1604 1608. Different resolutions are sometimes used when certain parts of a surface need to be more detailed than other parts. A 2.times.2 brush 1610 and a corresponding 4.times.4 brush 1612 are illustrated in FIG. 16.

Note that the left most pieces 1602,1606 can properly be painted using the 2.times.2 brush 1610. However, using the 2.times.2 brush 1610 to paint the right most pieces 1604, 1608 could cause problems. If the 2.times.2 brush 1610 were applied directly to the right most pieces 1604, 1608 (without any scaling), then the size of the brush after painting would be reduced on the right, which may not be what the user intended. If the brush were projected to properly match the resolution of the texture being painted on to preserve the physical size of the brush, in some cases the enlargement would cause the brush to look chunky or distorted. In other words, a lower resolution brush may paint fine on a lower resolution grid, but the same lower resolution brush may look chunky on a higher resolution grid.

Therefore, the resolution of a brush being used should be compared to the resolution of the texture being painted. If the brush resolution is smaller than the texture resolution, any resultant projections may appear chunky. Thus, an appropriately sized brush (from FIG. 15, operation 1536) is determined. One way this determination can be made is by matching the brush resolution to be at least the resolution of the texture. A table can be used to store different brush resolutions of the same brush image. A custom brush size image can also be made by starting with a resolution higher than is needed and conventionally resizing the dimensions downward as needed. When the resolution of a brush defined by an image needs to be increased, bilinear interpolation or even a Mitchell filter can be used. For procedural brushes, an image at the right resolution can be produced from its definition.

In an embodiment of the present invention, overscan techniques can be used to prevent or reduce artifacts. Sometimes, a pixel may lie partially inside and partially outside of an object surface boundary, causing artifacts. See U.S. Pat. No. 6,037,948, for a more detailed discussion of this problem.

Depending on the rendering technique used, pixels partially inside the surface or even completely outside the surface will contribute in the final rendered color. Texture point sampling will use any pixel at least partially covered, bilinear interpolation will also use all the neighbors of the set of pixels defined above. Those two cases are addressed by U.S. Pat. No. 6,037,948. When conventional mip-mapping rendering is used, all pixels may contribute, including the one arbitrary far from the painted areas. It is thus important that all those background pixels are assigned with an appropriate color.

Figure 17:
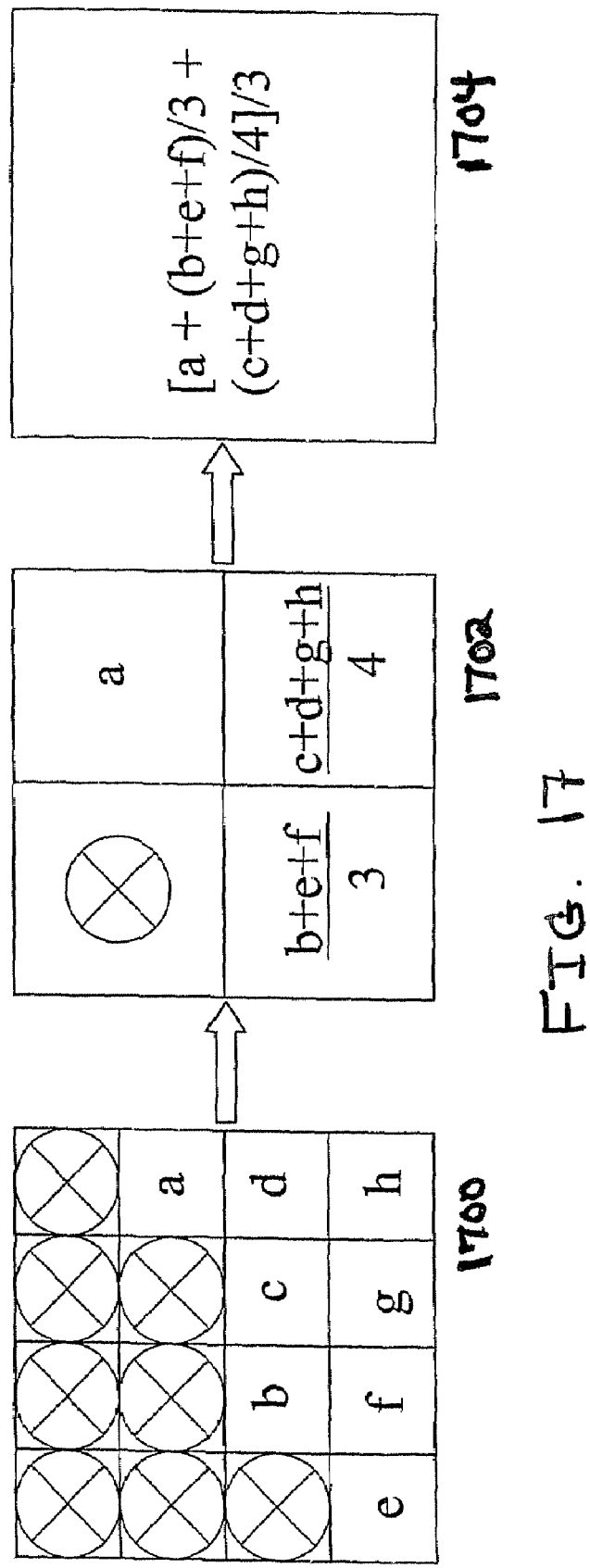
FIG. 17 is a diagram illustrating a first operation for coloring background overscan pixel, according to one embodiment of the present invention.

FIG. 17 is a diagram illustrating a first operation for coloring background pixels after conventional overscan. Block 1700 illustrates a 4.times.4 grid with background pixels designated by a "" First, the MIPMAP levels are computed keeping track of the background pixels.

Block 1702 illustrates a second level for coloring background pixels. Four pixels from the previous level (1700) correspond to one pixel at this level. If the 4 corresponding pixels at the previous level are background pixels, the new pixel is also a background pixel. Otherwise, the color is the average of the non-background pixels.

Block 1704 illustrates a third level for coloring background overscan pixels. The color is the average of the previous non-background pixels.

Figure 18:
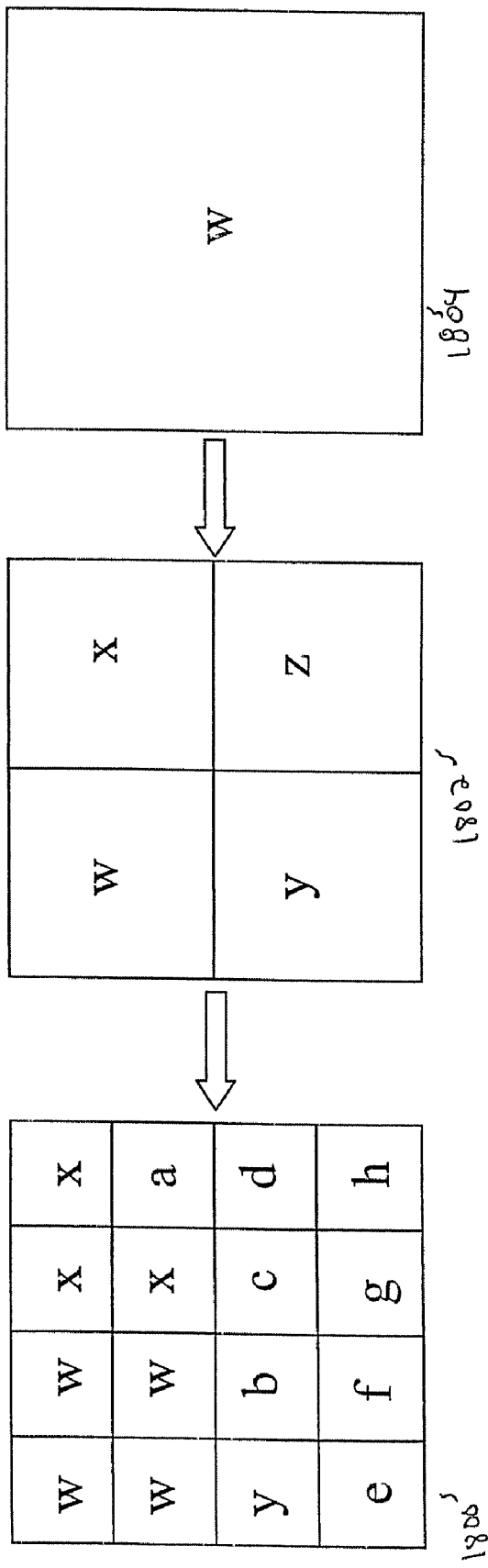
FIG. 18 is a diagram illustrating a second operation for coloring background overscan pixels, according to one embodiment of the present invention.

FIG. 18 is a diagram illustrating a second operation for coloring background overscan pixels.

Block 1804 represents the color computed from block 1704 in FIG. 17 (w=Block 1802 represents a traversal of the second level of the MIPMAP in the other direction, this time assigning w to only the background pixels illustrated in block 1702 of FIG. 17. Otherwise, the previously computed pixel values (block 1702) remain the same. In block 1802, x=a, y=((b+e+f)/3) and z=((c+d+g+h)/4). Block 1800 represents the traversal back to the first level of the MIPMAP. Any background pixels from block 1700, FIG. 17, are given the corresponding coarser level values from block 1802. For example, from block 1700 from FIG. 17, the upper left most 4 pixels are background pixels, so they are colored with color w from FIG. 18, block 1802. The pixel at column 1, row 3 of block 1800 is also designated as a background pixel in block 1700, therefore it is colored with the corresponding color y from block 1802. The remaining background pixels from block 1700 are colored with color x. The non-background pixels are unchanged.

The result of the above-described background filling process is that a conventional MIPMAP algorithm will then produce the correct result, without having to distinguish painted from background pixels. In particular, conventional hardware can be used without any background color leakage happening along the texture seams as coarser levels of the MIPMAP are used.

Figure 19:
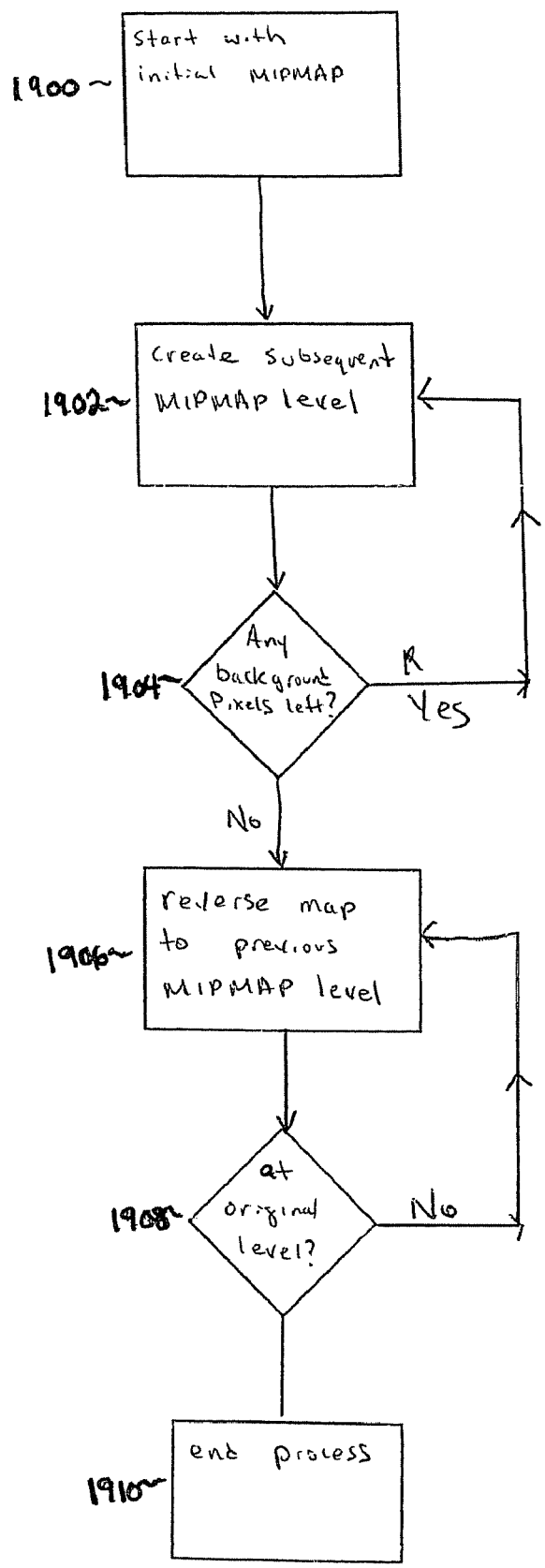
FIG. 19 represents a flowchart for implementing one embodiment of the overscanning process described above.

FIG. 19 represents a flowchart for implementing one embodiment of the overscanning process described above. The process first starts 1900 with an initial MIPMAP (i.e. FIG. 17, item 1700).

The process then creates 1902 a subsequent MIPMAP level. The method used in the example above assigns or correlates four pixels in the previous level to one pixel in the next level, and assigns each pixel to the average of the non-background pixels. The assigning could be considered a "consolidating" of pixels, in other words assigning one pixel to a plurality of corresponding pixels.

The process then checks 1904 to see if any background pixels are left in the newly created level. If there are background pixels left, then the process returns to create 1902 another subsequent MIPMAP level.

If there are no background pixels left, then from the checking 1904, the process then reverse maps 1906 to the previous MIPMAP level (for example as illustrated in FIG. 18). The process then checks 1908 to see if the process is currently at the original level. If not, then the process continues to reverse map 1906.

If the checking 1908 operation determines that the process has reached the original level, then the process ends 1910. Assuming that at least one pixel was painted, no background pixels should now be in the newly created MIPMAP.

In another embodiment of the invention, an "effect brush" can be used to paint on a 3D surface. An effect brush is one for which an algorithm is applied to the surface. The brush can use a predefined filter (or effect) and/or perform an active process on an area to be painted. Effect brushes have commonly been used in two-dimensional painting programs. Examples of known effect brushes include blur, smear, soften, sharpen, solarize, etc.

The present invention allows a user to paint directly on a three dimensional surface using an effect brush. Thus, the user can easily apply special effects and brushes directly and easily onto a three dimensional surface.

Figure 20:
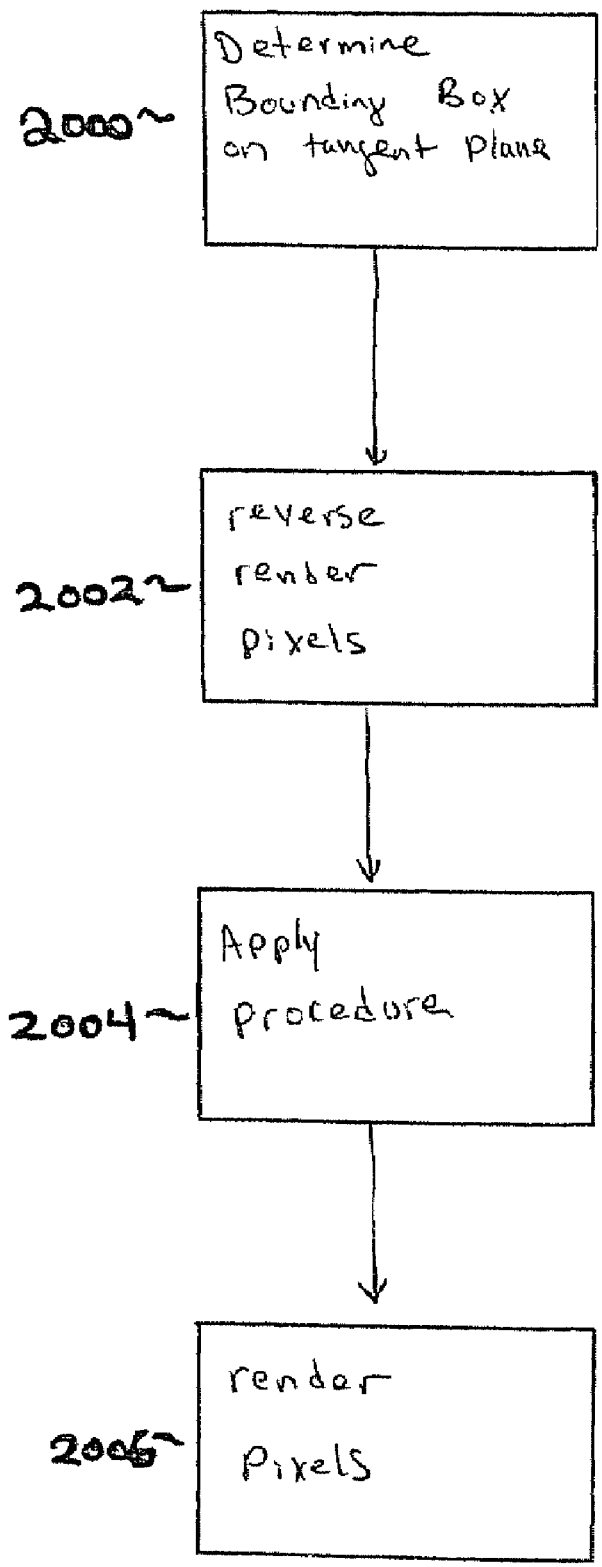
FIG. 20 is a flowchart illustrating one method of applying a procedural brush directly onto a three dimensional surface, according to one embodiment of the present invention.

FIG. 20 is a flowchart illustrating one method of applying an effect brush directly onto a three dimensional surface. The method first determines 2000 the bounding box on the tangent plane to be painted, typically in the same way as illustrated in FIG. 15.

The process then reverse renders 2002 pixels from the three-dimensional surface inside the bounding box to an area in memory. The process then applies 2004 a predetermined procedure or filter to the area in memory (i.e. blur, soften, etc.)

After the applying 2004, the process then renders 2006 the pixels in the area in memory back onto the same bounding box on the three dimensional surface.

Figure 21:
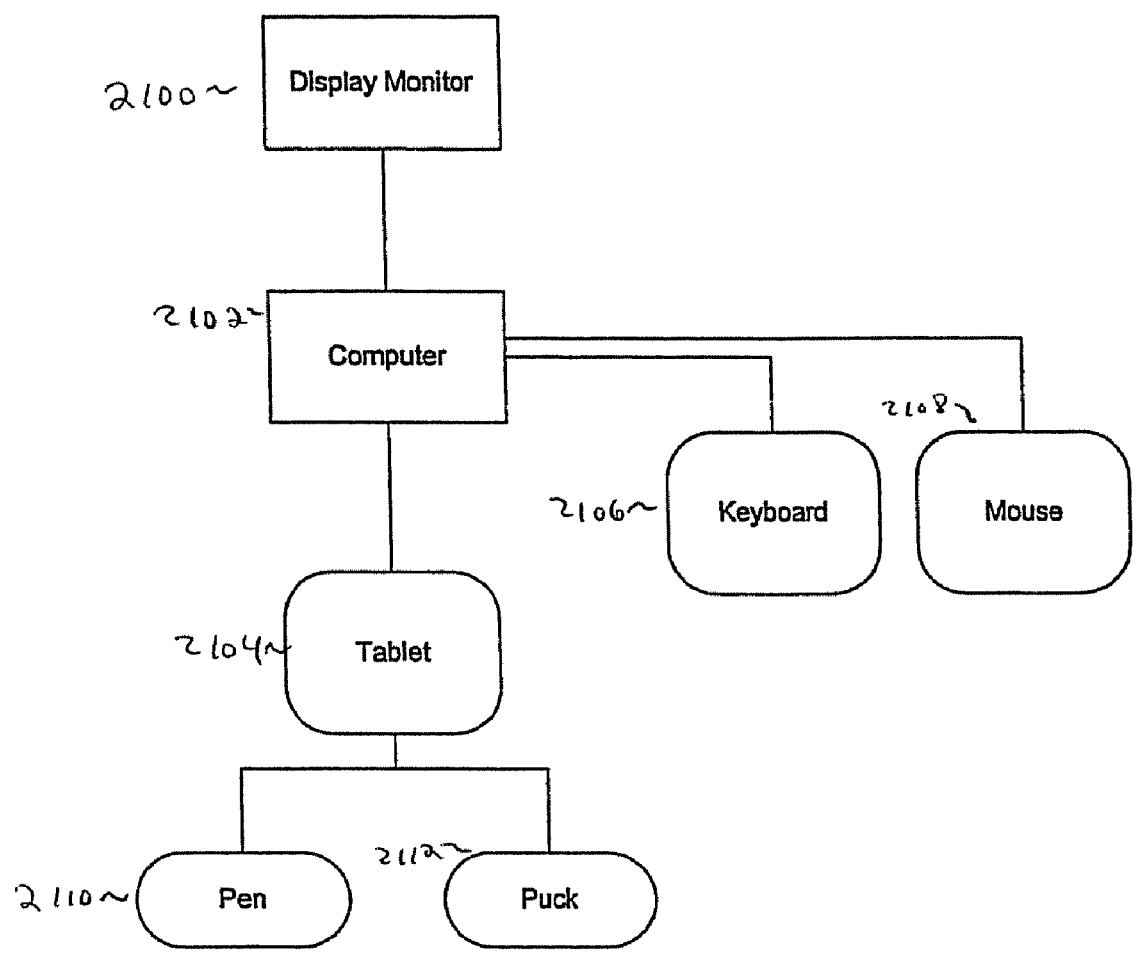
FIG. 21 is a block diagram illustrating one example of a sample configuration of hardware used to implement the present invention, according to one embodiment of the present invention.

FIG. 21 is a block diagram illustrating one example of a configuration of hardware used to implement the present invention.

A display monitor 2100 is connected to a computer 2102. The computer performs the operational processes described herein based upon input from a keyboard 2106 and/or a mouse 2108. A drawing tablet 2104 can also be connected to the computer 2102. In addition, a drawing pen 2110 and/or a puck 2112 can also be used as input devices for the tablet. Of course, any applicable configuration of hardware can be used to implement the present invention.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A method, comprising:
    selecting an area of a displayed parametric object living in three dimensional or higher space; and
    painting a brush texture map of a volumetric brush directly onto a texture map of a surface of the area of the displayed parametric object in the three dimensional or higher space within a volume of the brush based on brush orientations that minimize a distortion of a painted texture when displayed on the surface.

2. A method as recited in claim 1, wherein the brush is cylindrical with a defined depth.

3. A computer graphics method, comprising:
    selecting an area of a displayed parametric object existing in three dimensional space; and
    painting a brush texture map of a computer graphics volumetric brush onto a texture map of a surface of the area of the displayed parametric object in the three dimensional within a volume of the brush based on brush orientations that minimize a distortion of a painted texture when displayed on the surface.

* * * * *

UNITED STATES PATENT AND TRADEMARK OFFICE
CERTIFICATE OF CORRECTION

PATENT NO.         : 7,446,778 B2
APPLICATION NO.    : 11/622228
DATED              : November 4, 2008
INVENTOR(S)        : Jerome Maillot et al.

It is certified that error appears in the above-identified patent and that said Letters Patent is hereby corrected as shown below:

Title Page, Column 1 (Inventors), Line 1, change "Anna" to --Ania--.

Title Page, Column 1 (Assignee), Line 1, change "San Ranfael" to --San Rafael--.

Title Page, Column 2 (U.S. Patent Documents), Line 1, change "Leipa" to --Liepa--.

Column 1, Line 10, change "Ser.No." to --Ser. No.--.

Column 1, Line 12, change "et al," to --et al.,--.

Column 1, Line 16, change "Jul. 19 2001," to --Jul. 19, 2001,--.

Column 1, Line 19, change "US." to --U.S.--.

Column 1, Line 20, change "Mar" to --Mar.--.

Column 3, Line 59, change "invention." to --invention;--.

Column 7, Line 54, change "I(st)" to --I(s, t)--.

Column 7, Line 56, change "Using" to --using--.

Column 7, Line 63, change "1B" to --11B--.

Column 8, Line 62, change "15B" to --14B--.

Column 10, Line 14, after "T" insert --.--.

Column 10, Line 44, change "1604 1605" to --1604, 1608.--.

UNITED STATES PATENT AND TRADEMARK OFFICE
CERTIFICATE OF CORRECTION

PATENT NO. : 7,446,778 B2
APPLICATION NO. : 11/622228
DATED : November 4, 2008
INVENTOR(S) : Jerome Maillot et al.

It is certified that error appears in the above-identified patent and that said Letters Patent is hereby corrected as shown below:

Column 11, Line 43, change "1802" to --1802)--.

Signed and Sealed this

Twentieth Day of January, 2009

JON W. DUDAS
*Director of the United States Patent and Trademark Office*